United States Patent
Suzuki

(10) Patent No.: US 9,575,310 B2
(45) Date of Patent: Feb. 21, 2017

(54) OPTICAL SYSTEM FOR ENDOSCOPE AND ENDOSCOPE

(71) Applicant: CANON KABUSHIKI KAISHA, Tokyo (JP)

(72) Inventor: Masayuki Suzuki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/655,531

(22) PCT Filed: Dec. 18, 2013

(86) PCT No.: PCT/JP2013/085016
§ 371 (c)(1),
(2) Date: Jun. 25, 2015

(87) PCT Pub. No.: WO2014/104263
PCT Pub. Date: Jul. 3, 2014

(65) Prior Publication Data
US 2015/0362719 A1    Dec. 17, 2015

(30) Foreign Application Priority Data
Dec. 27, 2012   (JP) ................ 2012-285258

(51) Int. Cl.
G02B 21/00     (2006.01)
G02B 23/24     (2006.01)
G02B 17/08     (2006.01)
G02B 27/00     (2006.01)
G02B 27/10     (2006.01)

(52) U.S. Cl.
CPC ............ *G02B 23/243* (2013.01); *G02B 17/08* (2013.01); *G02B 17/0852* (2013.01); *G02B 27/0025* (2013.01); *G02B 27/1066* (2013.01)

(58) Field of Classification Search
CPC . G02B 21/0028; G02B 23/24; G02B 23/2407; G02B 23/2415; G02B 23/2423; G02B 23/243; G02B 23/2453; G02B 23/2461; G02B 23/2461
USPC .............. 359/365, 364, 435, 631, 637, 639; 348/72, 45; 600/920
See application file for complete search history.

(56) References Cited

U.S. PATENT DOCUMENTS

2002/0024741 A1* 2/2002 Terasawa ............. G02B 13/143
                                                                359/627
2008/0239480 A1   10/2008 Tomioka
2011/0170111 A1*  7/2011 Rolland ................ G01B 9/021
                                                                356/479

FOREIGN PATENT DOCUMENTS

JP       63-311316 A      12/1988
JP       10-73762 A        3/1998
JP       10-197787 A       7/1998
(Continued)

OTHER PUBLICATIONS

Liang, R., "Optical Design for Biomedical Imaging" (Chapter 8), SPIE Press, pp. 386-399; 442-443.

*Primary Examiner* — Stephone B Allen
*Assistant Examiner* — Travis Fissel
(74) *Attorney, Agent, or Firm* — Canon USA Inc., IP Division

(57) ABSTRACT

An optical system for an endoscope includes an objective lens, a relay lens arrangement, and a correction optical system disposed in an optical path on a proximal end side of the objective lens. The correction optical system corrects curvature of field caused by the relay lens arrangement. In the optical system for an endoscope, the correction optical system includes at least one concave mirror having an aspherical surface.

9 Claims, 21 Drawing Sheets

(56) References Cited

FOREIGN PATENT DOCUMENTS

| | | |
|---|---|---|
| JP | H11-332820 A | 12/1999 |
| JP | 2001-228401 A | 8/2001 |
| JP | 2006-039259 A | 2/2006 |
| JP | 2006-330194 A | 12/2006 |
| JP | 2007-522507 A | 8/2007 |
| JP | 2011-013647 A | 1/2011 |
| JP | 2011-062378 A | 3/2011 |
| JP | 2011-145315 A | 7/2011 |

* cited by examiner

OPTICAL SYSTEM FOR ENDOSCOPE AND ENDOSCOPE

TECHNICAL FIELD

The present invention relates to an optical system for an endoscope, and in particular, the optical system using a relay lens.

BACKGROUND ART

A rigid endoscope that uses a relay lens includes an objective lens and a relay lens. The relay lens transmits an image formed by the objective lens toward the proximal end side of the objective lens. By watching light beams that exit from the relay lens through an eyepiece, an object can be directly observed by a human eye. Alternatively, light beams that exit from the relay lens are formed again on an image pickup device by an imaging lens, thereby the obtained image is displayed in a display device for observation.

A relay lens proposed by Hopkins, in which rod lenses are used, is widely used. This Hopkins type relay lens has advantages in that a bright image is obtained, chromatic aberration is corrected, and asymmetric aberration is also corrected. However, with the Hopkins type relay lens, curvature of field remains. Accordingly, when the number of relay sets is increased or the numerical aperture is increased, effects of curvature of field are increased. This may degrade performance. In order to address this, NPL 1 discloses a technology in which the Hopkins type relay lens is modified so that curvature of field is reduced.

Also, in order to reduce curvature of field of a relay lens, PTL 1 discloses a technology, in which an optical system including two triplets combined together is used as a relay set of a relay lens. Here, each of the triplets includes lenses having positive, negative, and positive refractive powers. With this technology, curvature of field is reduced by an effect produced by the negative lens of the triplet.

In the relay lens disclosed in PTL 1, the triplet design is used to correct curvature of field with the negative lens included in each of the triplets. It is described in PTL1 that, with this negative lens, not only curvature of field caused by the triplet itself but also curvature of field caused by other relay sets using a related-art relay lens can be corrected. However, PTL 1 discloses only the appearance of the triplet and does not disclose a numerical embodiment or aberration. Thus, it is not clear that to what extent the triplet can correct curvature of field caused by the other relay sets of the relay lens. The refractive power of the negative lens needs to be increased for correcting curvature of field within the triplet. In addition, in order to also correct curvature of field caused by the relay lenses of the other relay sets, the refractive power of the negative lens needs to be further increased. The further increase in the refractive power of the negative lens increases spherical aberration, astigmatism, and axial chromatic aberration. This may lead to degradation of imaging performance. In addition, the relay lens becomes more sensitive to decenter. This may lead to an increase in the manufacturing cost. Thus, a further increase in the number of the relay sets of the related-art relay lens used in other relay sets is difficult.

CITATION LIST

Patent Literature

PTL 1 U.S. Patent Application Publication No. 2008/0239480

Non Patent Literature

NPL 1 Liang, Rongguang: Optical Design for Biomedical Imaging (Chapter 8), SPIE PRESS

SUMMARY OF INVENTION

The present invention provides an optical system for an endoscope with which desirable optical performance can be obtained even when the number of relay sets of the relay lens is increased.

An optical system for an endoscope according to an aspect of the present invention includes an objective lens, a relay lens arrangement, and a correction optical system disposed in an optical path on a proximal end side of the objective lens. The correction optical system corrects curvature of field caused by the relay lens arrangement. In the optical system for an endoscope, the correction optical system includes at least one concave mirror having an aspherical surface.

An optical system for an endoscope according to another aspect of the present invention includes an objective lens, a relay lens arrangement, and a correction optical system disposed in an optical path on a proximal end side of the objective lens. The correction optical system corrects curvature of field caused by the relay lens arrangement. In the optical system for an endoscope, the correction optical system includes an aspherical lens and at least one concave mirror.

Further features of the present invention will become apparent from the following description of exemplary embodiments with reference to the attached drawings.

DESCRIPTION OF EMBODIMENTS

Figure 1:
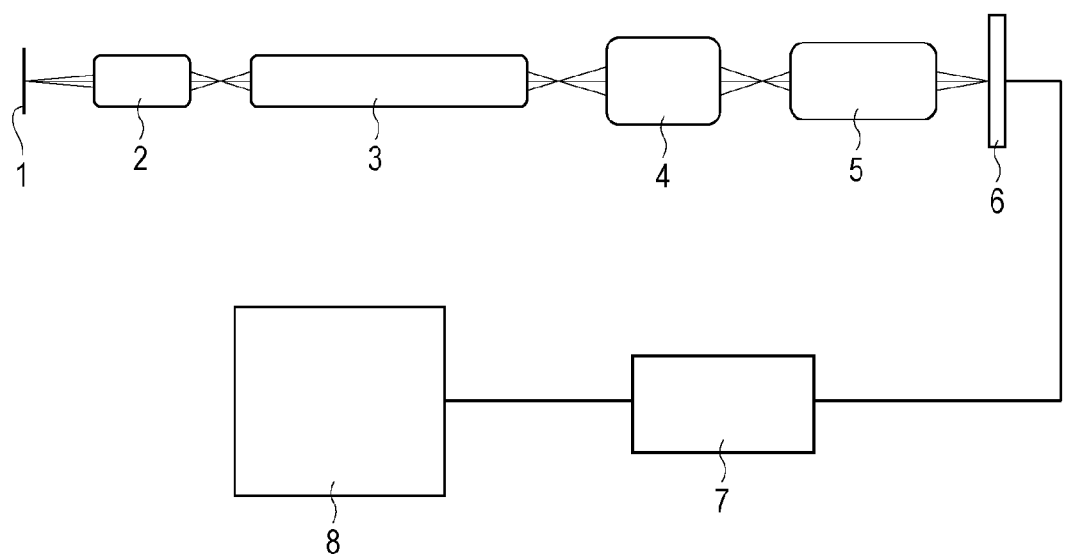
FIG. 1 is a schematic view of a main portion of an optical system for an endoscope according a first embodiment.

An optical system for an endoscope according to the present invention includes an objective lens, a relay lens arrangement, and a correction optical system. The correction optical system corrects the curvature of field caused by the relay lens arrangement in an optical path toward the proximal end side of the objective lens. The correction optical system includes concave mirrors having an aspherical surface or concave mirrors and aspherical surface lenses.

The relay lens arrangement causes the curvature of field in an under direction, and the concave mirrors included in the correction optical system cause the curvature of field in the over direction, which is a direction opposite to the under direction. As a result, the curvature of field caused by the relay lens arrangement is canceled out by the curvature of field caused by the concave mirrors included in the correction optical system. The aspherical shape of the correction optical system is mainly used to correct astigmatism. Thus, both the astigmatism and the curvature of field can be corrected.

Furthermore, at least one beam splitter can be provided. In this case, degradation in imaging performance can be reduced and light incident upon the concave mirrors and the light reflected by the concave mirrors can be separated.

Defining that the refractive power of each refractive surface of the relay lens arrangement is $\phi i$ (i being a positive integer, for example, i=1, 2, 3 . . . ), the refractive index of a medium on the distal end side of each refractive surface is Ni, the refractive index of a medium on the proximal end side of each refractive surface is Ni', and the sum of $\phi i/(Ni \cdot Ni')$ of the relay lens arrangement is L. Also, defining that the refractive power of each surface of the correction optical system is $\phi j$ (j being a positive integer, for example, i=1, 2, 3 . . . ), the refractive index of a medium on the distal end side of each surface is Nj, the refractive index of a medium on the proximal end side of each surface is Nj', and the sum of $\phi j/(Nj \cdot Nj')$ in the correction optical system is M. When S=M/L, it is preferable that the following relationship be satisfied: S<−0.50. When parameter S does not fall within this range, the curvature of the concave mirrors of the correction optical system is excessively reduced and the effect of correcting the curvature of field is reduced. The refractive indices here are signed, and the signs are changed in accordance with the light traveling direction.

The aspherical surface of the correction optical system can be shaped such that the local curvature of the aspherical surface is reducing from a central part toward a circumferential part. With this shape, astigmatism is more desirably corrected.

Defining that the number of concave mirrors included in an imaging optical system of the correction optical system is kk, the average of thicknesses of the beam splitters is dd, the average of the absolute values of the refractive indices of the beam splitters is nn, and the average of the absolute values of the radii of curvature of the concave mirrors is RR. When T=nn·RR/(kk·dd), it is preferable that T>1.1 be satisfied. When parameter T does not fall within this range, it is highly likely that the image plane of the correction optical system is located in the beam splitters. In this case, a sensor cannot be directly disposed in the image plane of the correction optical system, and accordingly, the image needs to be formed again on the proximal end side of the beam splitter. To do this, an additional optical system such as an imaging lens needs to be disposed in the optical path on the proximal end side of the beam splitter. This is undesirable since the size of the device is increased.

First Embodiment

A first embodiment is described with reference to FIGS. 1 to 6. FIG. 1 is a schematic view of a main portion of an optical system for an endoscope according the present embodiment. Referring to FIG. 1, reference numeral 1 denotes an object, reference numeral 2 denotes an objective lens, reference numeral 3 denotes a relay lens, reference numeral 4 denotes a correction optical system, reference numeral 5 denotes an imaging lens, and reference numeral 6 denotes an image pickup device. In FIG. 1, the object 1 is illuminated with a lighting optical system (not shown), and an image of the object 1 is formed by the objective lens 2 disposed near the object 1. The formed image is optically transmitted through the relay lens 3 and passes through the correction optical system 4. After that, the image of the object 1 is formed again on the image pickup device 6 by the imaging lens 5. The image of the object 1 picked up by the image pickup device 6 is displayed in a display device (not shown) through electrical circuitry (not shown).

Figure 2A:
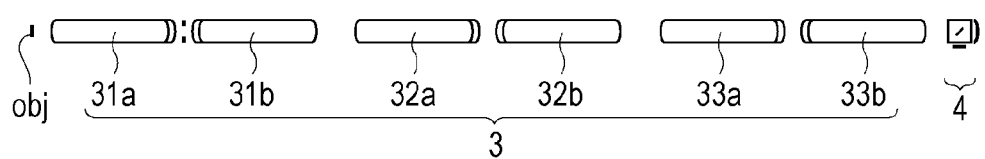
FIGS. 2A and 2B illustrate a relay lens and a correction optical system of the optical system for an endoscope according to the first embodiment.
Figure 2B:
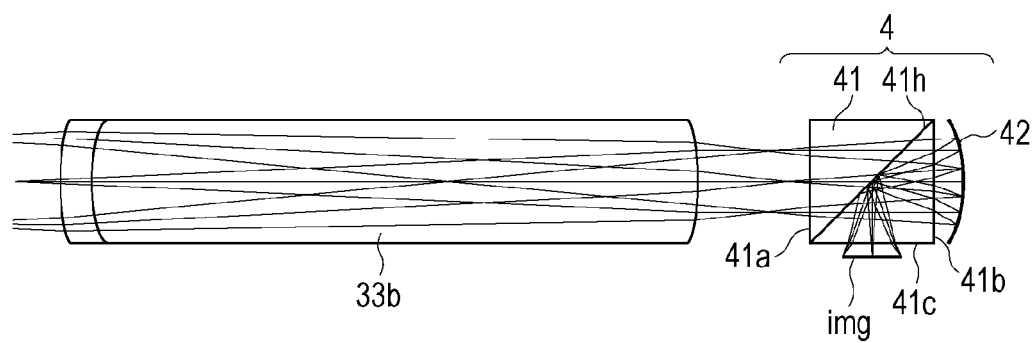

FIGS. 2A and 2B are sectional views of the relay lens 3 and the correction optical system 4. Specifically, FIG. 2A is a sectional view illustrating an outline of the relay lens 3 and the correction optical system 4, and FIG. 2B is an enlarged sectional view illustrating the correction optical system 4, a region around the correction optical system 4, and optical paths. Referring to FIG. 2A, the relay lens 3 includes rod lenses 31a, 31b, 32a, 32b, 33a, and 33b. Each of the rod lenses includes a thick convex lens and thin concave lens which are cemented to each other. The rod lenses 31a, 32a and 33a are respectively combined with the rod lenses 31b, 32b, and 33b. Each combination of the rod lenses corresponds to a relay set in a Hopkins relay lens and forms an image with a magnification of −1. In the present embodiment, three relay sets are arranged one after another. A plane denoted as "obj" on the distal end side of the relay lens 3 is an object plane of the relay lens 3 and an image plane of the objective lens 2. The correction optical system 4 is disposed on the proximal end side (right side in FIGS. 2A and 2B) of the relay lens 3.

Referring to FIG. 2B, the correction optical system 4 includes a beam splitter 41 and a concave mirror 42. Light beams having exited the object plane obj of the relay lens 3 pass through the rod lenses of the relay lens 3 from lens to lens in order and converge after passing through the rod lens 33b. After that, the light beams enter the beam splitter 41 from a surface 41a, pass through a surface 41h, and exit the beam splitter 41 from a surface 41b. Next, the light beams are reflected by the concave mirror 42, enter the beam splitter 41 from the surface 41b, are reflected and redirected by the surface 41h, and exit the beam splitter 41 from a surface 41c. An aerial image is formed on an image plane img of the correction optical system 4 by the beams having exited the beam splitter 41. The image formed on the image plane img is formed again on the image pickup device 6 by the imaging lens 5, which is disposed next to the correction optical system 4.

In a first numerical embodiment, surfaces number (surfaces No.) 1 to No. 23 correspond to the relay lens 3 and surfaces No. 25 to No. 30 correspond to the correction optical system 4. The surface No. 29 corresponds to the reflective surface, which is inclined at 45 degrees, of the beam splitter. The surface No. 27 has an aspherical shape. By using the concave mirror 42 in the correction optical system 4 and appropriately selecting the radius of curvature of the concave mirror 42, curvature of field caused by the relay lens 3 is reduced. By using the concave mirror 42 having an aspherical surface and appropriately setting the aspherical coefficient of the concave mirror 42, astigmatism caused by the relay lens 3 and the concave mirror 42 itself is reduced.

In the present embodiment, L=0.484, M=−0.484, and S=−1.000. Thus, S<−0.50 is satisfied. Regarding the surface No. 27, which has an aspherical shape, the sign of the radius of curvature r is opposite to the sign of the aspherical coefficient of fourth order, and the aspherical coefficients of the sixth and higher orders are zero. Thus, the surface No. 27 has a shape in which the local curvature is reducing from a central part toward a circumferential part.

In the present embodiment, the number of concave mirrors is one, the average of thicknesses of the beam splitters is 4.00 mm, the average of the absolute values of the refractive indices of the beam splitters is 1.51633, and the average of the absolute values of the radii of curvature of the concave mirrors is 4.13 mm. Thus, T=1.566, and accordingly, T>1.1 is satisfied.

Figure 3:
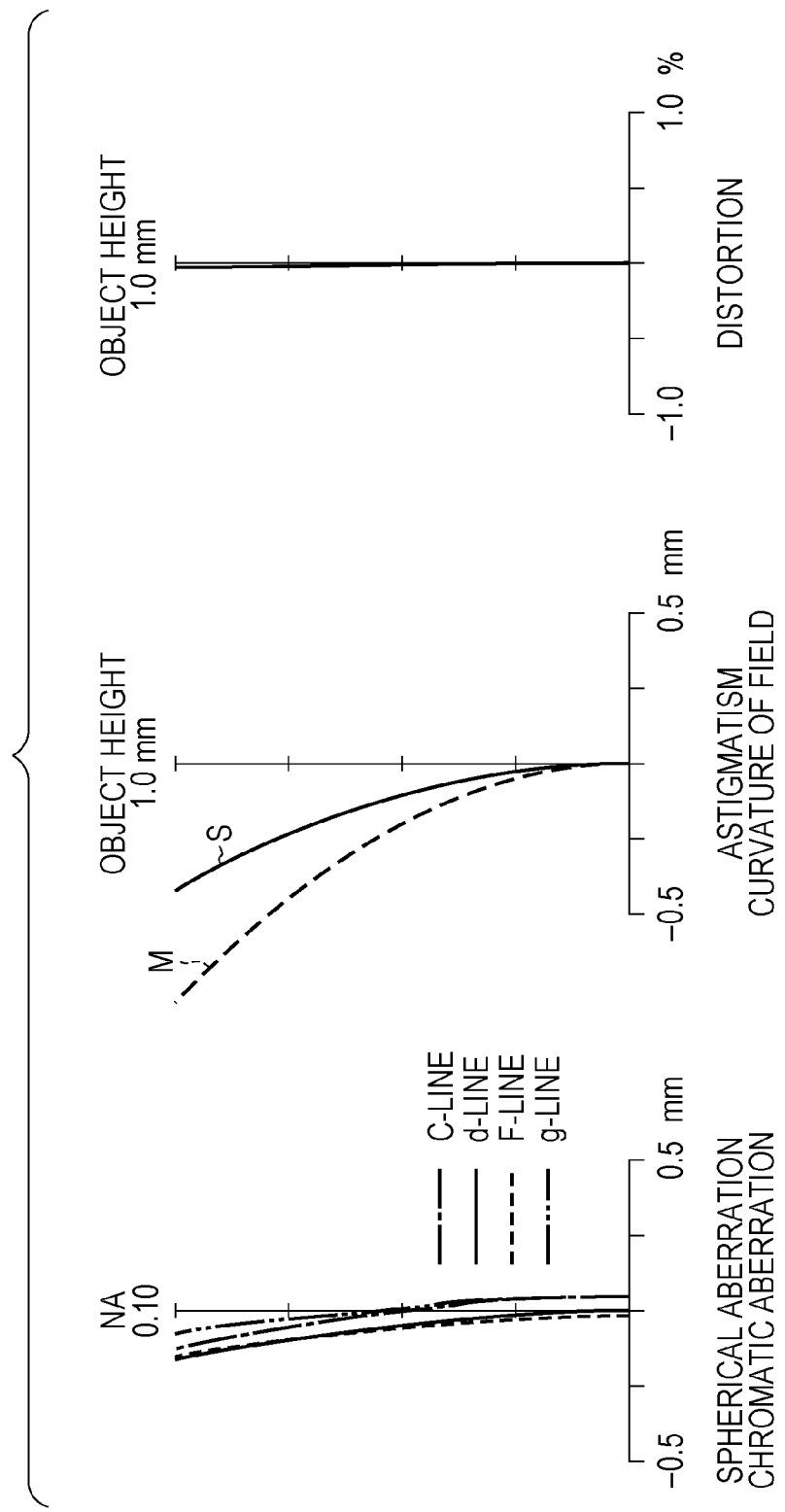
FIG. 3 illustrates longitudinal aberrations of the optical system for an endoscope according to the first embodiment only with the relay lens.
Figure 4:
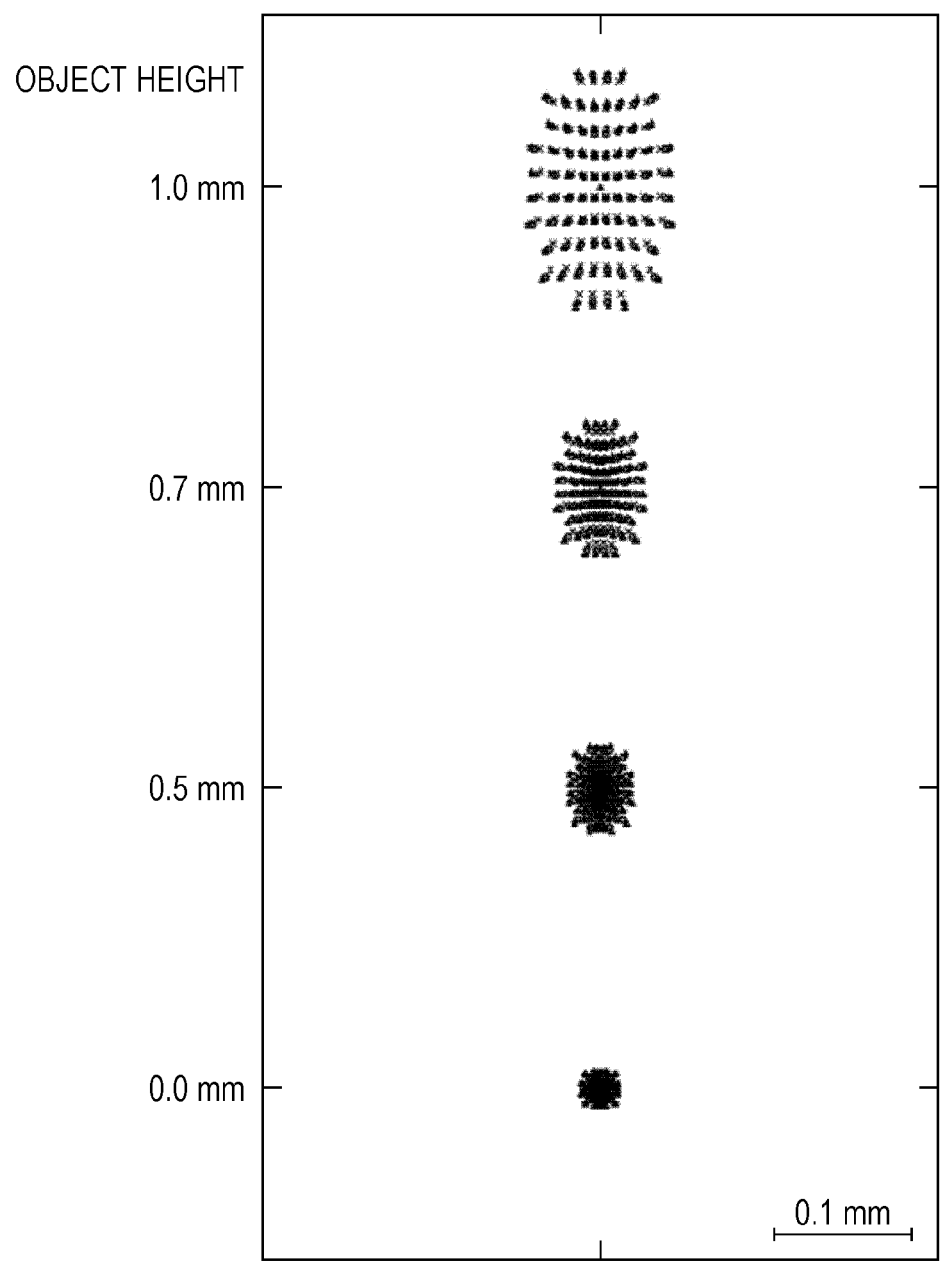
FIG. 4 illustrates a spot diagram of the optical system for an endoscope according to the first embodiment only with the relay lens.

FIGS. 3 and 4 illustrate the optical performance of the optical system according to the present embodiment using only the relay lens 3. FIG. 3 includes charts of longitudinal aberrations. The charts illustrate, from left to right, spherical aberration and chromatic aberration, astigmatism and curvature of field, and distortion. It can be seen from FIG. 3 that, with the relay lens 3 only, spherical aberration and chromatic aberration are in desirable state but significant curvature of field and astigmatism are caused. FIG. 4 illustrates a spot diagram of four points of an object height of 0 to 1.0 mm on the image plane of the relay lens 3. An 0.1 mm scale is provided at the lower right of FIG. 4. It can be seen from FIG. 4 that, although the performance on the axis is good, the spot diameter significantly increases at off-axis positions, thereby degrading the performance. Thus, only with the Hopkins relay lens, curvature of field remains.

Figure 5:
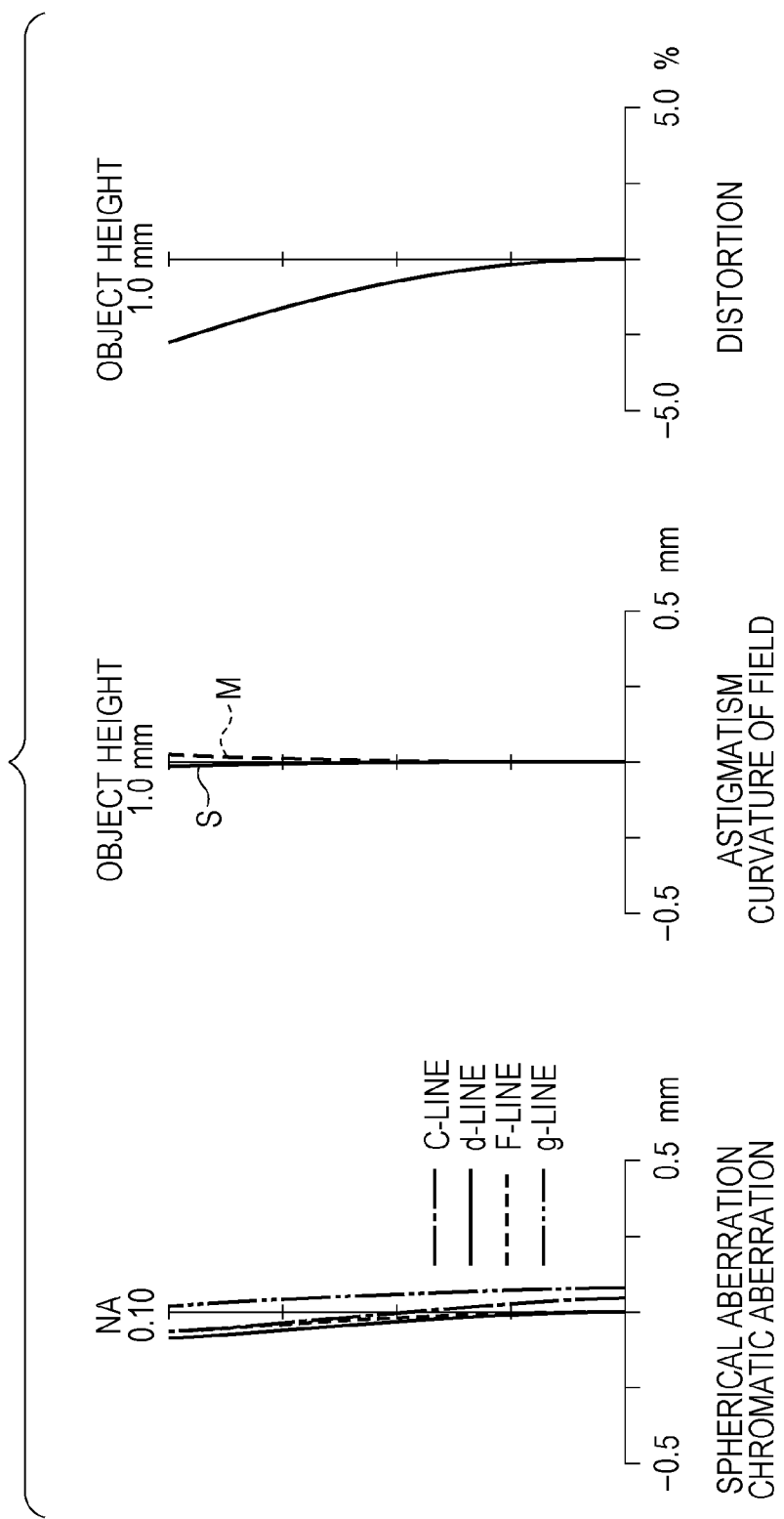
FIG. 5 illustrates longitudinal aberrations of an optical system in which the relay lens and the correction optical system of the optical system for an endoscope according to the first embodiment are combined.
Figure 6:
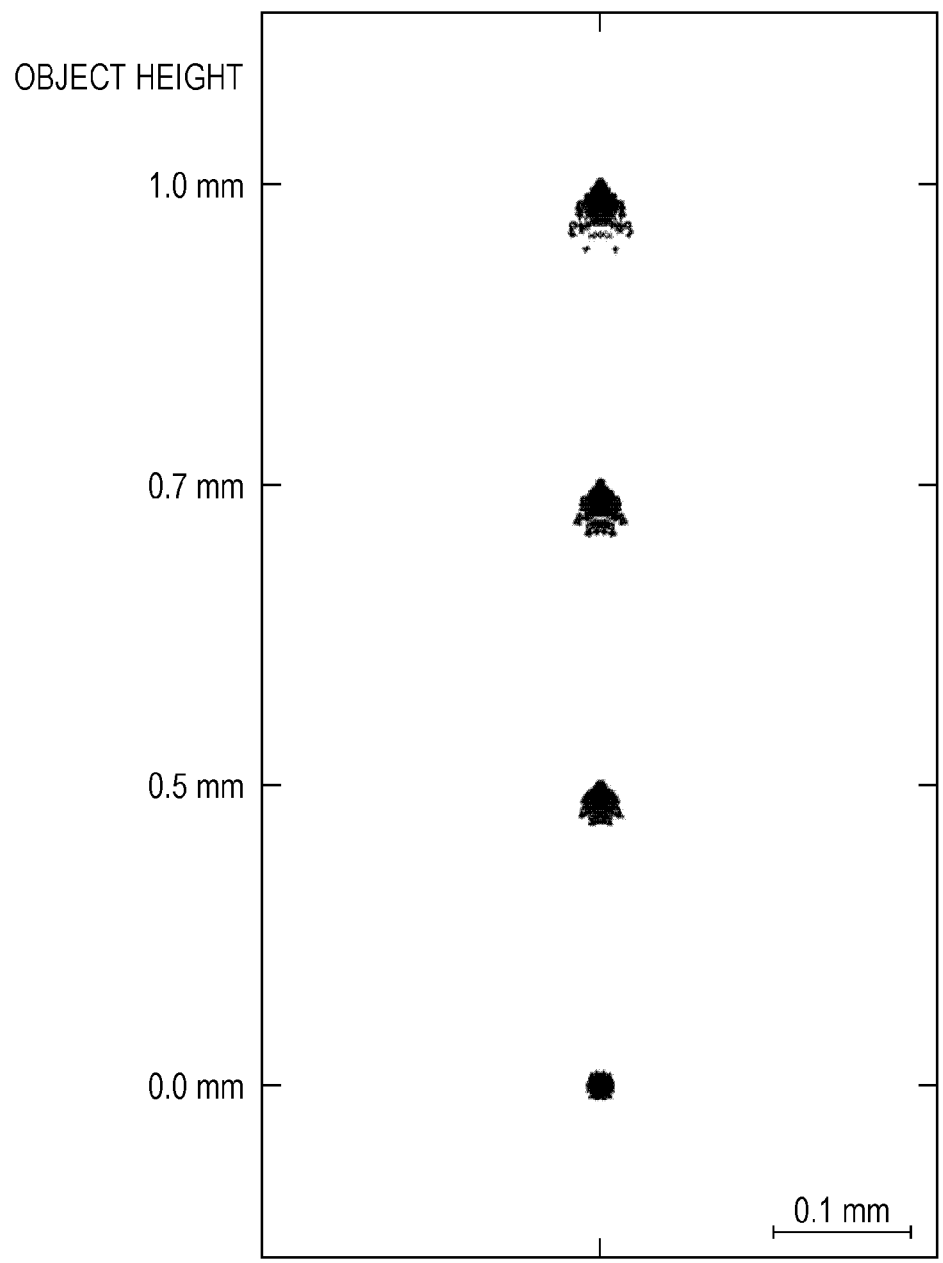
FIG. 6 illustrates a spot diagram of the optical system in which the relay lens and the correction optical system of the optical system for an endoscope according to the first embodiment are combined.

FIGS. 5 and 6 illustrate the optical performance of an optical system in which the relay lens 3 and the correction optical system 4 of the optical system according to the present embodiment are combined. FIG. 5 illustrates longitudinal aberrations and FIG. 6 illustrates a spot diagram. It can be seen from FIG. 5 that, by combining the relay lens 3 and the correction optical system 4, curvature of field and astigmatism are significantly reduced. Furthermore, it can be seen from FIG. 6 that the spot diameter at off-axis positions is significantly reduced.

Second Embodiment

A second embodiment is described with reference to FIGS. 7 to 9. Portions other than the correction optical system are similar to those of the first embodiment.

Figure 7A:
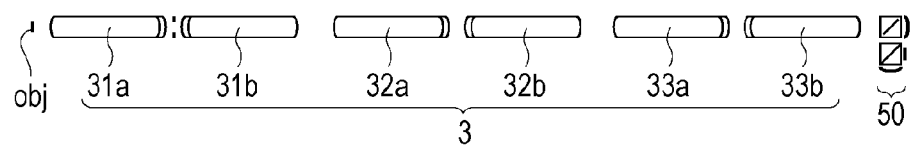
FIGS. 7A and 7B illustrate a relay lens and a correction optical system of an optical system for an endoscope according to a second embodiment.
Figure 7B:
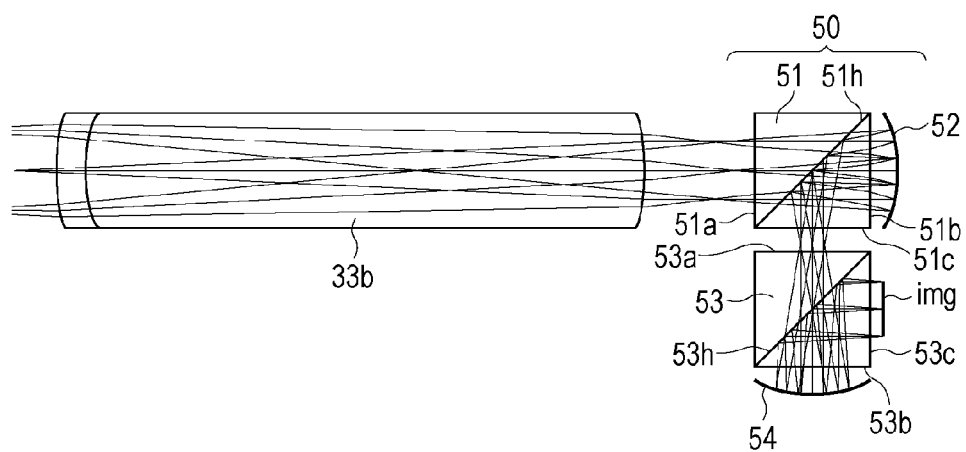

FIGS. 7A and 7B are sectional views of the relay lens 3 and a correction optical system 50. Specifically, FIG. 7A is a sectional view illustrating an outline of the relay lens 3 and the correction optical system 50, and FIG. 7B is an enlarged sectional view illustrating the correction optical system 50, a region around the correction optical system 50, and optical paths. The relay lens 3 is similar to that used in the first embodiment. Referring to FIG. 7A, a surface denoted as "obj" on the distal end side of the relay lens 3 is an object plane of the relay lens 3 and an image plane of the objective lens 2. The correction optical system 50 is disposed on the proximal end side (right side in FIGS. 7A and 7B) of the relay lens 3. Referring to FIG. 7B, the correction optical system 50 includes a beam splitter 51 as a first beam splitter, a concave mirror 52 as a first concave mirror, a beam splitter 53 as a second beam splitter, and a concave mirror 54 as a second concave mirror.

Light beams that exit the object plane obj of the relay lens 3 pass through the rod lenses of the relay lens 3 from lens to lens in order and converge after passing through the rod lens 33b. After that, the light beams enter the beam splitter 51 from a surface 51a, pass through a surface 51h, and exit the beam splitter 51 from a surface 51b. Next, the light beams are reflected by the concave mirror 52, enter the beam splitter 51 from the surface 51b, are reflected and redirected by the surface 51h, and exit the beam splitter 51 from a surface 51c. The light beams having exited the beam splitter 51 enter the beam splitter 53 from a surface 53a, pass through a surface 53h, and exit the beam splitter 53 from a surface 53b. Next, the light beams are reflected by the concave mirror 54, enter the beam splitter 53 from the surface 53b, are reflected and redirected by the surface 53h, and exit the beam splitter 53 from a surface 53c. Then, an aerial image is formed on an image plane img of the correction optical system 50. The image formed on the image plane img is formed again on the image pickup device 6 by the imaging lens 5, which is disposed next to the correction optical system 50.

The pupil is set between the concave mirror 52 and the concave mirror 54 (in FIG. 7B, an intermediate position between the surface 51c of the beam splitter 51 and the surface 53a of the beam splitter 53). With this structure, occurrence of asymmetric aberrations such as coma aberration, distortion, lateral chromatic aberration in the correction optical system 50 can be reduced. This reduction is based on a principle that asymmetric aberrations occurring in planes symmetric about the pupil are canceled out each other. Furthermore, both the object side and the image side of the correction optical system 50 can be made to be telecentric. Thus, the diameter of the endoscope can be reduced. An aperture stop may be disposed between the surface 51c and the surface 53a. Alternatively, the aperture stop may be disposed between the rod lenses 31a and 31b, between the rod lenses 32a and 32b, or between the rod lenses 33a and 33b in the relay lens 3. The beam splitter 51 and the beam splitter 53 are separated from each other here. However, when the beam splitters 51 and 53 are integrated with each other and the aperture stop cannot be disposed therebetween, the aperture stop may be disposed between the rod lenses. When the beam splitters 51 and 53 are integrated with each other, the surface 51h serves as the first beam splitter and the surface 53h serves the second beam splitter.

In a second numerical embodiment, surfaces No. 1 to No. 23 correspond to the relay lens 3 and surfaces No. 25 to No. 37 correspond to the correction optical system 50. The surfaces No. 29 and No. 36 correspond to the reflective surfaces, which are inclined at 45 degrees, of the beam splitters. The surfaces No. 27 and No. 34 have aspherical shapes.

By using the concave mirrors 52 and 54 in the correction optical system 50 and appropriately selecting the radii of curvature of the concave mirrors 52 and 54, curvature of field caused by the relay lens 3 is reduced. By using the concave mirrors 52 and 54 having aspherical surfaces and appropriately setting the aspherical coefficients of the concave mirrors 52 and 54, astigmatism caused by the relay lens 3 and the concave mirrors 52 and 54 themselves is reduced.

In the present embodiment, L=0.484, M=−0.485, and S=−1.002. Thus, S<−0.50 is satisfied. Regarding the surfaces No. 27 and No. 34, which have aspherical shapes, the signs of the radii of curvature r are opposite to the signs of the aspherical coefficients of fourth order, and the aspherical coefficients of the sixth and higher orders are zero. Thus, the surfaces No. 27 and No. 34 have shapes in which the local curvature is reducing from a central part toward a circumferential part. Also in the present embodiment, the radii of curvature of the two concave mirrors are the same as each other. This setting is desirable in order to reduce asymmetric aberration.

In the present embodiment, the number of concave mirrors is two, the average of thicknesses of the beam splitters is 4.00 mm, the average of the absolute values of the refractive indices of the beam splitters is 1.51633, and the average of the absolute values of the radii of curvature of the concave mirrors is 8.25 mm. Thus, T=1.564, and accordingly, T>1.1 is satisfied.

Figure 8:
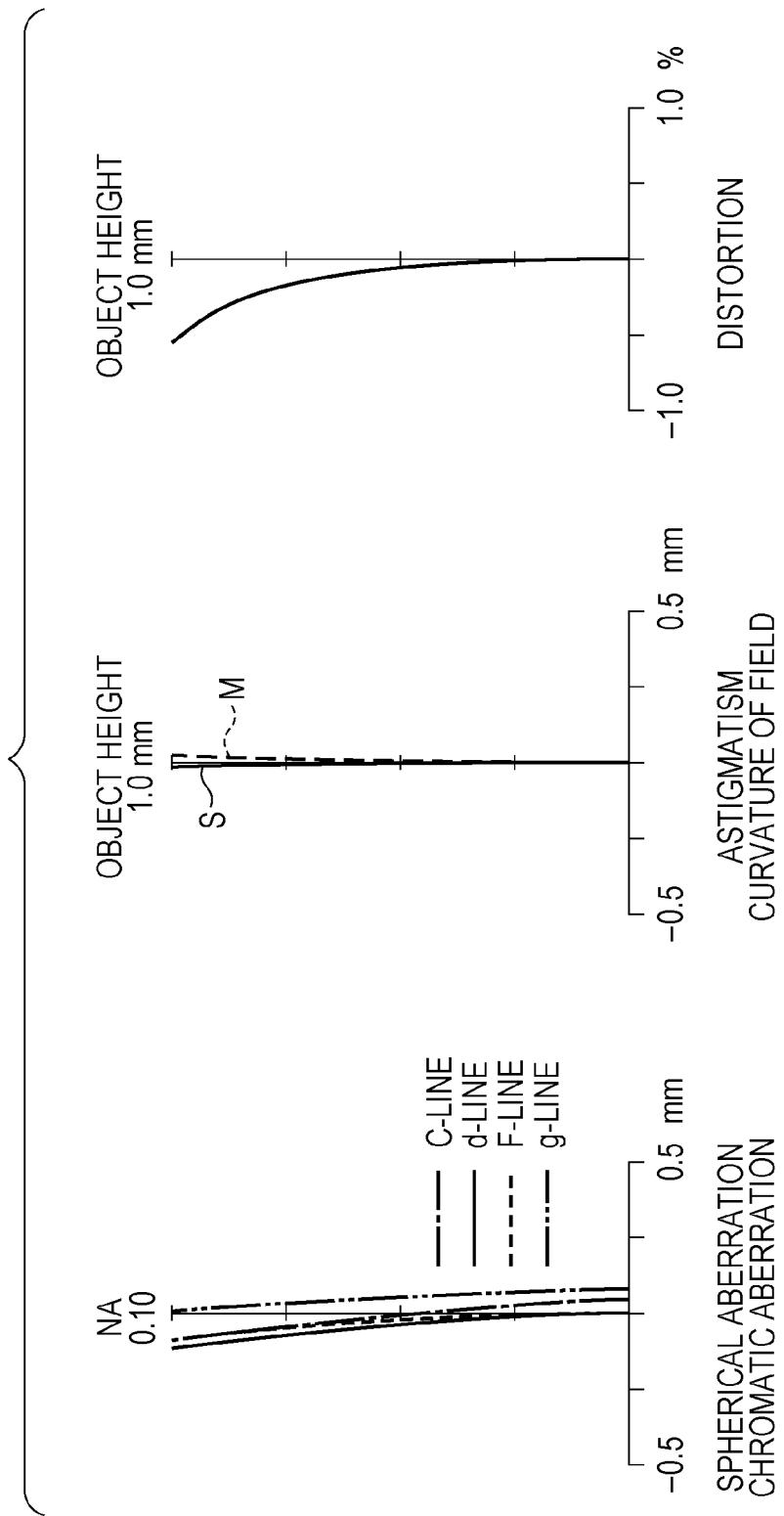
FIG. 8 illustrates longitudinal aberrations of an optical system in which the relay lens and the correction optical system of the optical system for an endoscope according to the second embodiment are combined.
Figure 9:
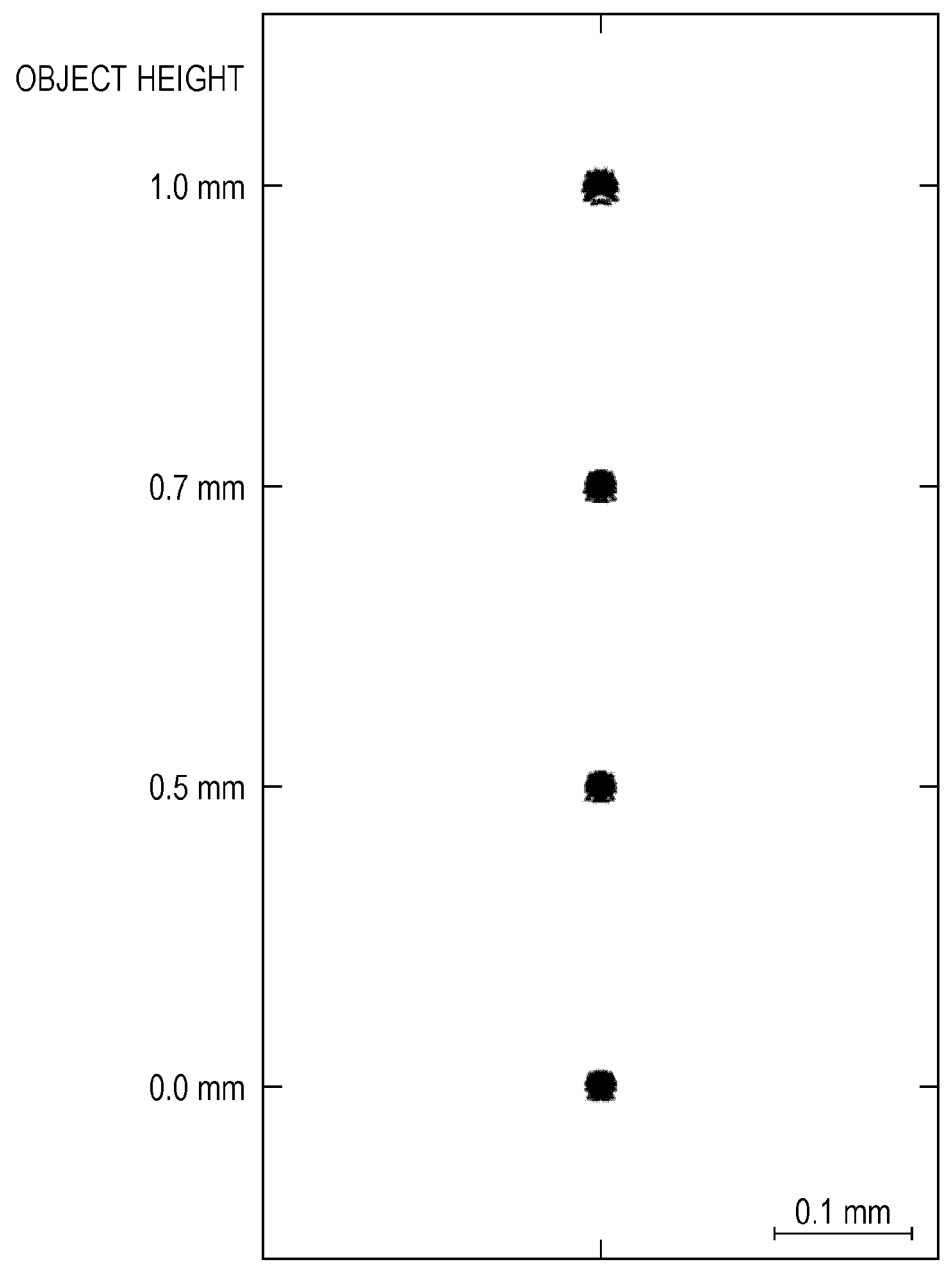
FIG. 9 illustrates a spot diagram of the optical system in which the relay lens and the correction optical system of the optical system for an endoscope according to the second embodiment are combined.

FIGS. 8 and 9 illustrate the optical performance of an optical system in which the relay lens 3 and the correction optical system 50 of the optical system according to the present embodiment are combined. FIG. 8 illustrates longitudinal aberrations and FIG. 9 illustrates a spot diagram. It can be seen from FIG. 8 that, by combining the relay lens 3 and the correction optical system 50, curvature of field and astigmatism are significantly reduced. Furthermore, it can be seen from FIG. 9 that the spot diameter at off-axis positions is significantly reduced. In the present embodiment, coma aberration and distortion are reduced compared to those in the first embodiment. The image side is made to be telecentric.

Third Embodiment

A third embodiment is described with reference to FIGS. 10 to 12. Portions other than the correction optical system are similar to those of the first embodiment.

Figure 10:
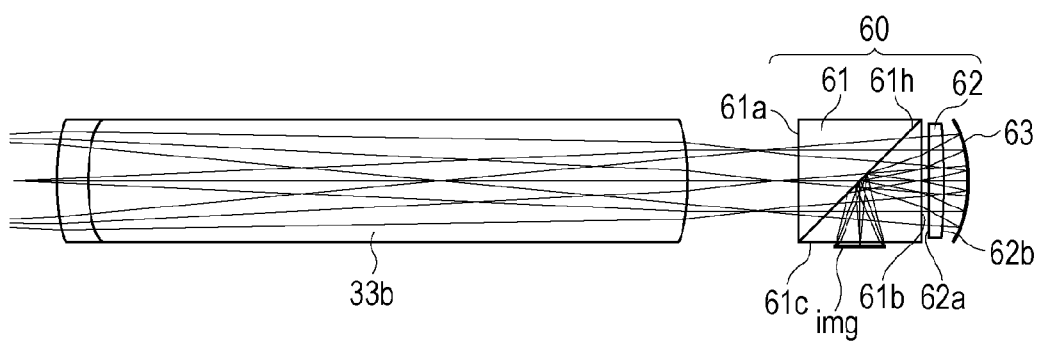
FIG. 10 illustrates a correction optical system of an optical system for an endoscope according to a third embodiment.

FIG. 10 is an enlarged sectional view illustrating a correction optical system 60, a region around the correction optical system 60, and optical paths. Referring to FIG. 10, the correction optical system 60 includes a beam splitter 61, an aspherical lens 62, and a concave mirror 63. Light beams pass through the rod lenses of the relay lens from lens to lens in order and converge after passing through the rod lens 33b. After that, the light beams enter the beam splitter 61 from a surface 61a, pass through a surface 61h, and exit the beam splitter 61 from a surface 61b. Then, the light beams pass through the aspherical lens 62 and are incident upon the concave mirror 63. The light beams are reflected by the concave mirror 63, pass through the aspherical lens 62 again, enter the beam splitter 61 from the surface 61b, are reflected and redirected by the surface 61h, and exit the beam splitter 61 from a surface 61c. Then, an aerial image is formed on an image plane img of the correction optical system 60. The image formed on the image plane img is formed again on the image pickup device 6 by the imaging lens 5, which is disposed next to the correction optical system 60.

In a third numerical embodiment, surfaces No. 25 to No. 34 correspond to the correction optical system 60. Surfaces up to surface No. 23 correspond to the relay lens and are the same as those of the first embodiment. The surface No. 33 corresponds to the reflective surface, which is inclined at 45 degrees, of the beam splitter. The surface No. 28 (surface No. 30) has an aspherical shape. The surfaces No. 28 and No. 30 are physically the same surface.

By using the concave mirror 63 in the correction optical system 60 and appropriately selecting the radius of curvature of the concave mirror 63, curvature of field caused by the relay lens 3 is reduced. By appropriately setting the aspherical coefficient of the aspherical lens 62, astigmatism caused by the relay lens 3 and the concave mirror 63 is reduced.

In the present embodiment, L=0.484, M=−0.355, and S=−0.733. Thus, S<−0.50 is satisfied. Regarding the surface No. 28 (surface No. 30), which has an aspherical shape, the sign of the radius of curvature r is opposite to the sign of the aspherical coefficient of fourth order, and the aspherical coefficients of the sixth and higher orders are zero. Thus, the surface No. 28 (surface No. 30) has a shape in which the local curvature is reducing from a central part toward a circumferential part.

In the present embodiment, the number of concave mirrors is one, the average of thicknesses of the beam splitters is 4.00 mm, the average of the absolute values of the refractive indices of the beam splitters is 1.51633, and the average of the absolute values of the radii of curvature of the concave mirrors is 5.00 mm. Thus, T=1.895, and accordingly, T>1.1 is satisfied.

Figure 11:
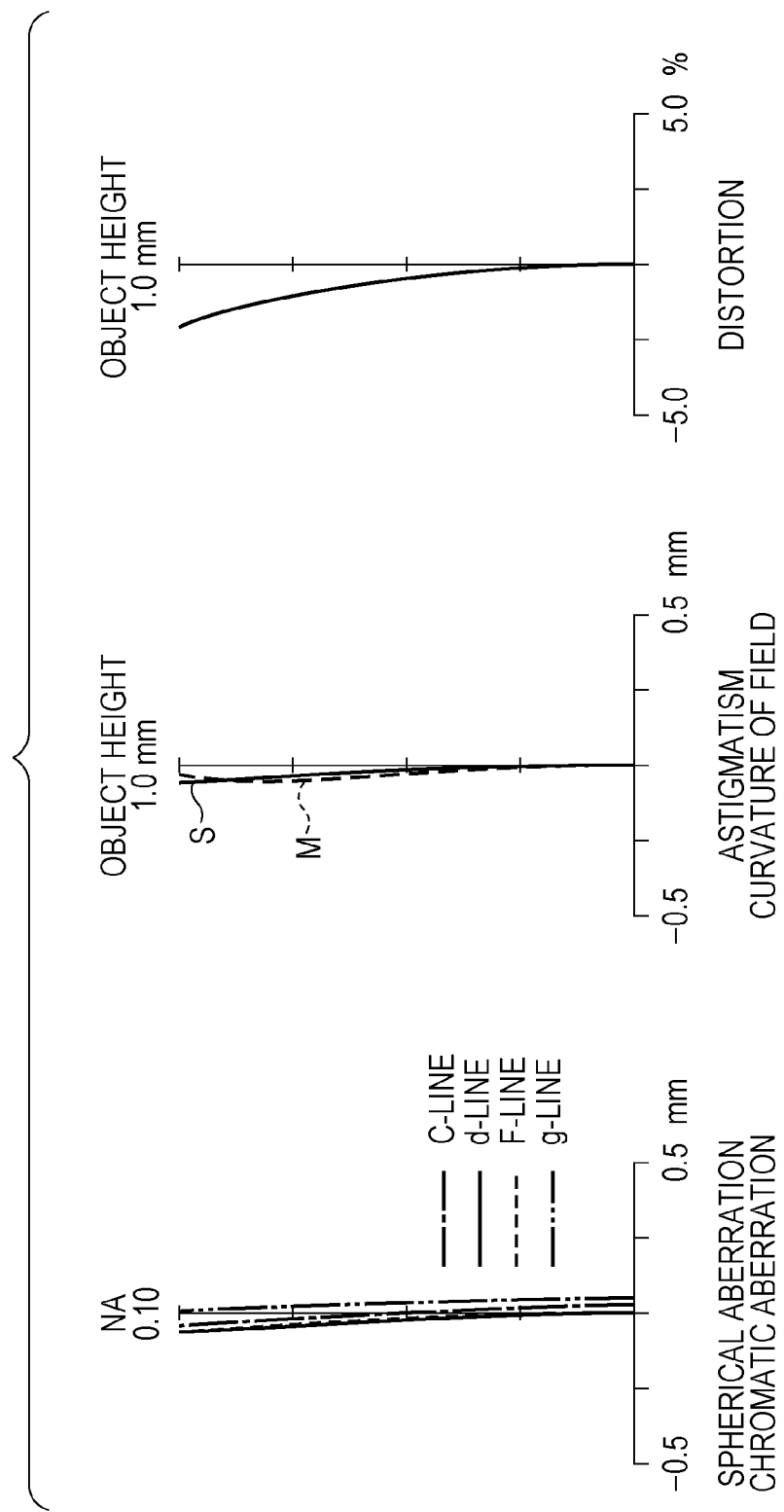
FIG. 11 illustrates longitudinal aberrations of an optical system in which a relay lens and the correction optical system of the optical system for an endoscope according to the third embodiment are combined.
Figure 12:
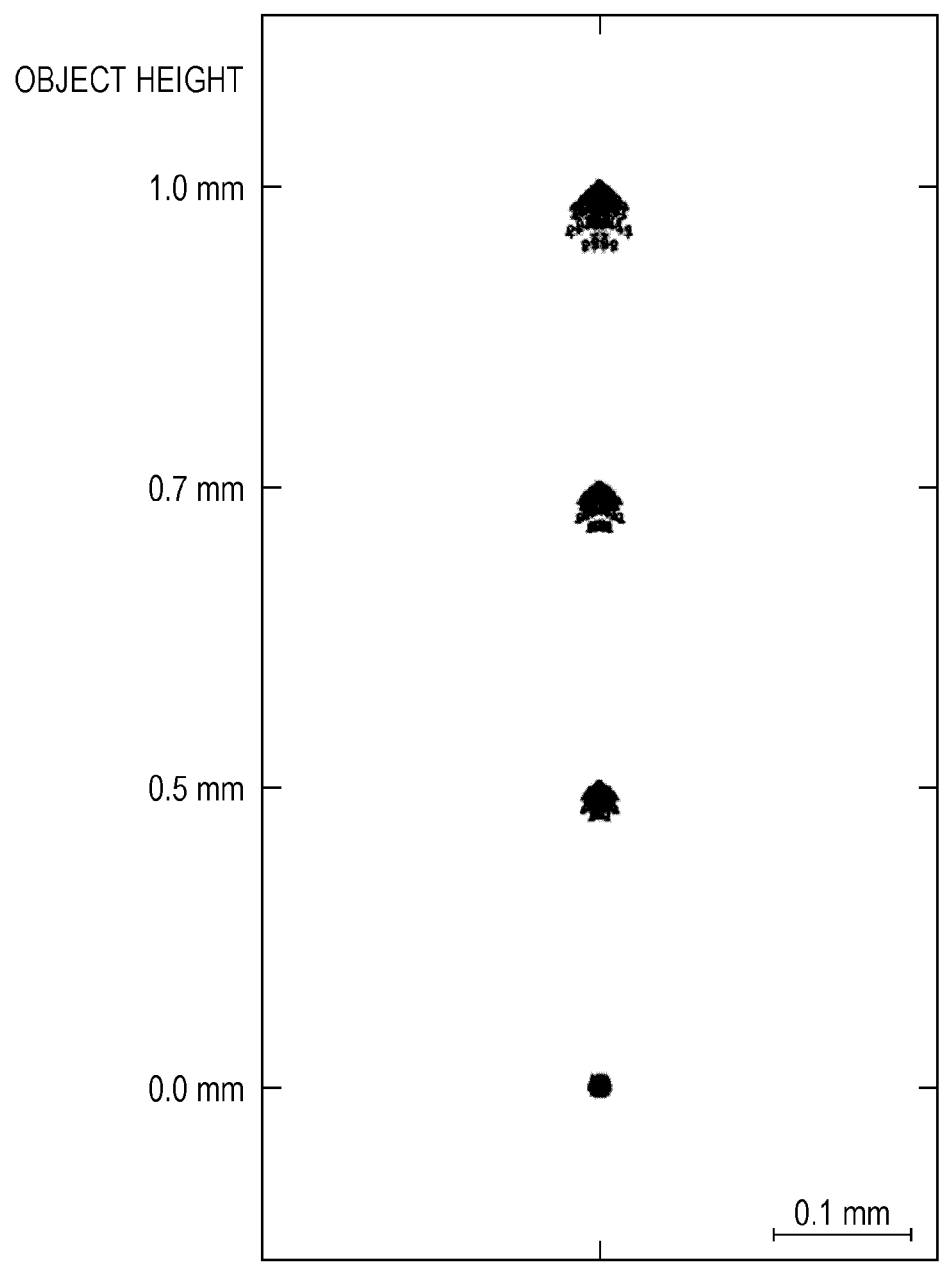
FIG. 12 illustrates a spot diagram of the optical system in which the relay lens and the correction optical system of the optical system for an endoscope according to the third embodiment are combined.

FIGS. 11 and 12 illustrate the optical performance of the optical system in which the relay lens 3 and the correction optical system 60 of the optical system according to the present embodiment are combined. FIG. 11 illustrates longitudinal aberrations and FIG. 12 illustrates a spot diagram. It can be seen from FIG. 11 that, by combining the relay lens 3 and the correction optical system 60, curvature of field and astigmatism are significantly reduced. Furthermore, it can be seen from FIG. 12 that the spot diameter at off-axis positions is significantly reduced.

Fourth Embodiment

A fourth embodiment is described with reference to FIGS. 13 to 15. Portions other than the correction optical system are similar to those of the first embodiment.

Figure 13:
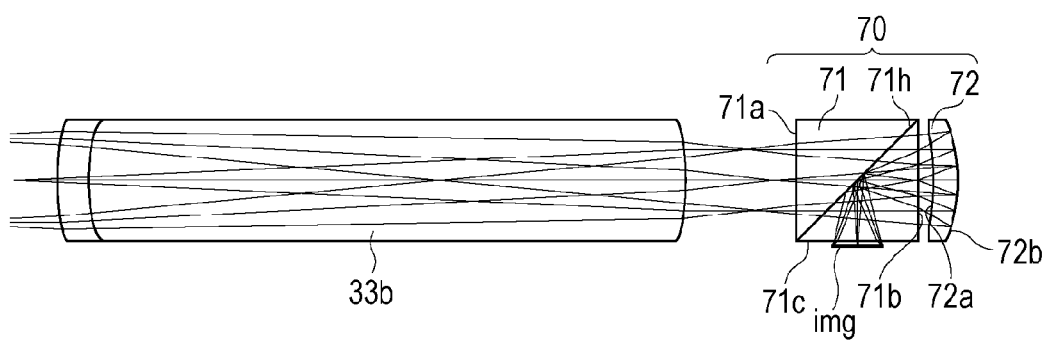
FIG. 13 illustrates a correction optical system of an optical system for an endoscope according to a fourth embodiment.

FIG. 13 is an enlarged sectional view illustrating a correction optical system 70, a region around the correction optical system 70, and optical paths. Referring to FIG. 13, the correction optical system 70 includes a beam splitter 71 and a Mangin mirror 72. Here, the Mangin mirror 72 corresponds to a concave mirror having an aspherical surface. Light beams pass through the rod lenses of the relay lens from lens to lens in order and converge after passing through the rod lens 33b. After that, the light beams enter the beam splitter 71 from a surface 71a, pass through a surface 71h, and exit the beam splitter 71 from a surface 71b. Next, the light beams are incident upon and refracted by a refractive surface 72a of the Mangin mirror 72 and reflected by a reflective surface 72b, which is a surface on the opposite side of the refractive surface 72a. After that, the light beams exit the Mangin mirror 72 from the refractive surface 72a, enter the beam splitter 71 from the surface 71b, are reflected and redirected by the surface 71h, and exit the beam splitter 71 from a surface 71c. Then, an aerial image is formed on an image plane img of the correction optical system 70. The image formed on the image plane img is formed again on the image pickup device 6 by the imaging lens 5, which is disposed next to the correction optical system 70.

In a fourth numerical embodiment, surfaces No. 25 to No. 32 correspond to the correction optical system 70. Surfaces up to surface No. 23 correspond to the relay lens and are the same as those of the first embodiment. The surface No. 31 corresponds to the reflective surface, which is inclined at 45 degrees, of the beam splitter. The surface No. 28 has an aspherical shape.

By using the Mangin mirror 72 in the correction optical system 70 and appropriately selecting the radius of curvature of the Mangin mirror 72, curvature of field caused by the relay lens 3 is reduced. By using the Mangin mirror 72, the reflective surface 72b of which has an aspherical shape, and appropriately setting the aspherical coefficient of the reflective surface 72b, astigmatism caused by the relay lens 3 and the Mangin mirror 72 itself is reduced.

In the present embodiment, L=0.484, M=−0.377, and S=−0.780. Thus, S<−0.50 is satisfied. Regarding the surface No. 28, the sign of the radius of curvature r is opposite to the sign of the aspherical coefficient of fourth order, and the aspherical coefficients of the sixth and higher orders are zero. Thus, the surface No. 28 has a shape in which the local curvature is reducing from a central part toward a circumferential part.

In the present embodiment, the number of concave mirrors is one, the average of thicknesses of the beam splitters is 4.00 mm, the average of the absolute values of the refractive indices of the beam splitters is 1.51633, and the average of the absolute values of the radii of curvature of the concave mirrors is 5.00 mm. Thus, T=1.895, and accordingly, T>1.1 is satisfied.

Figure 14:
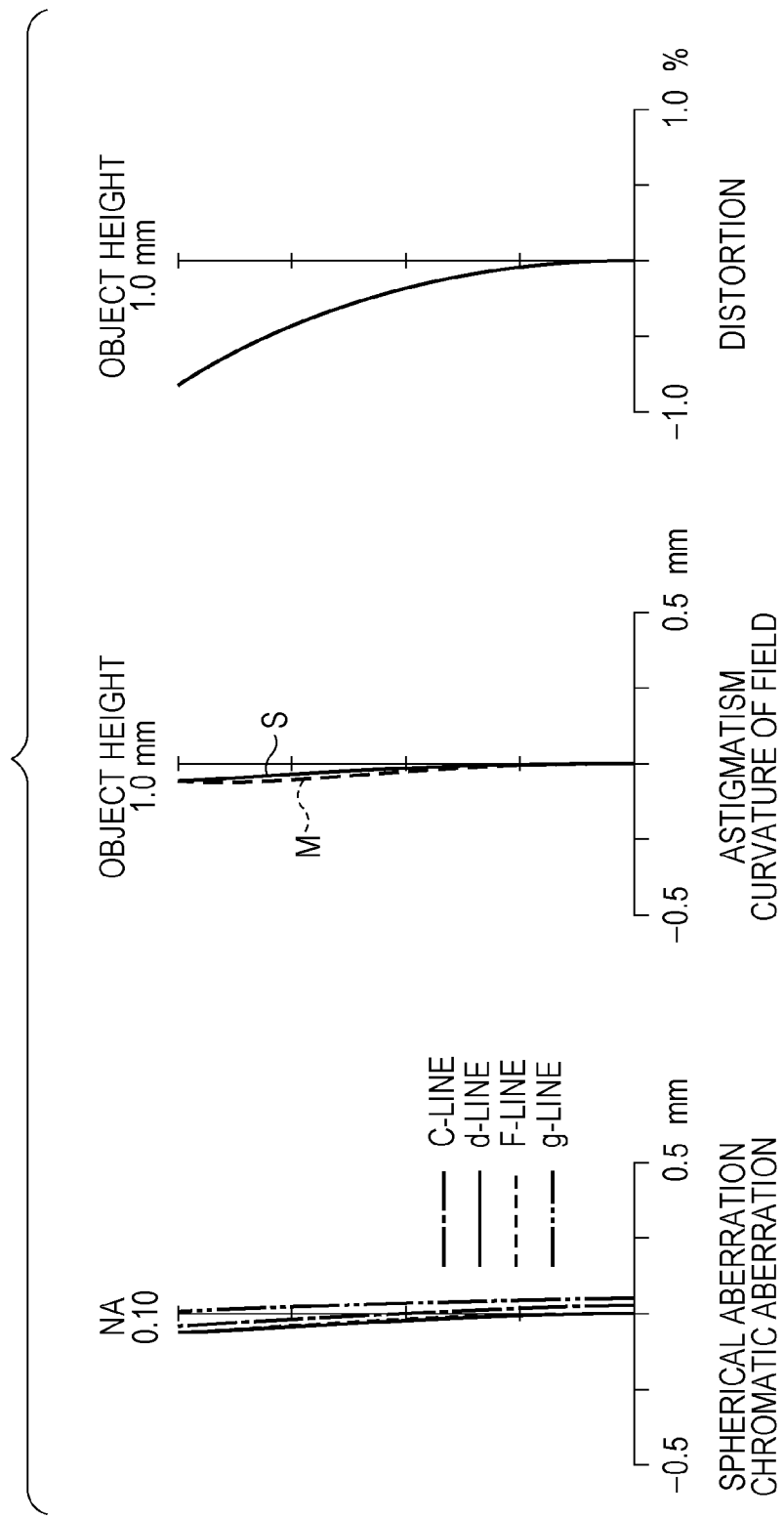
FIG. 14 illustrates longitudinal aberrations of an optical system in which a relay lens and the correction optical system of the optical system for an endoscope according to the fourth embodiment are combined.
Figure 15:
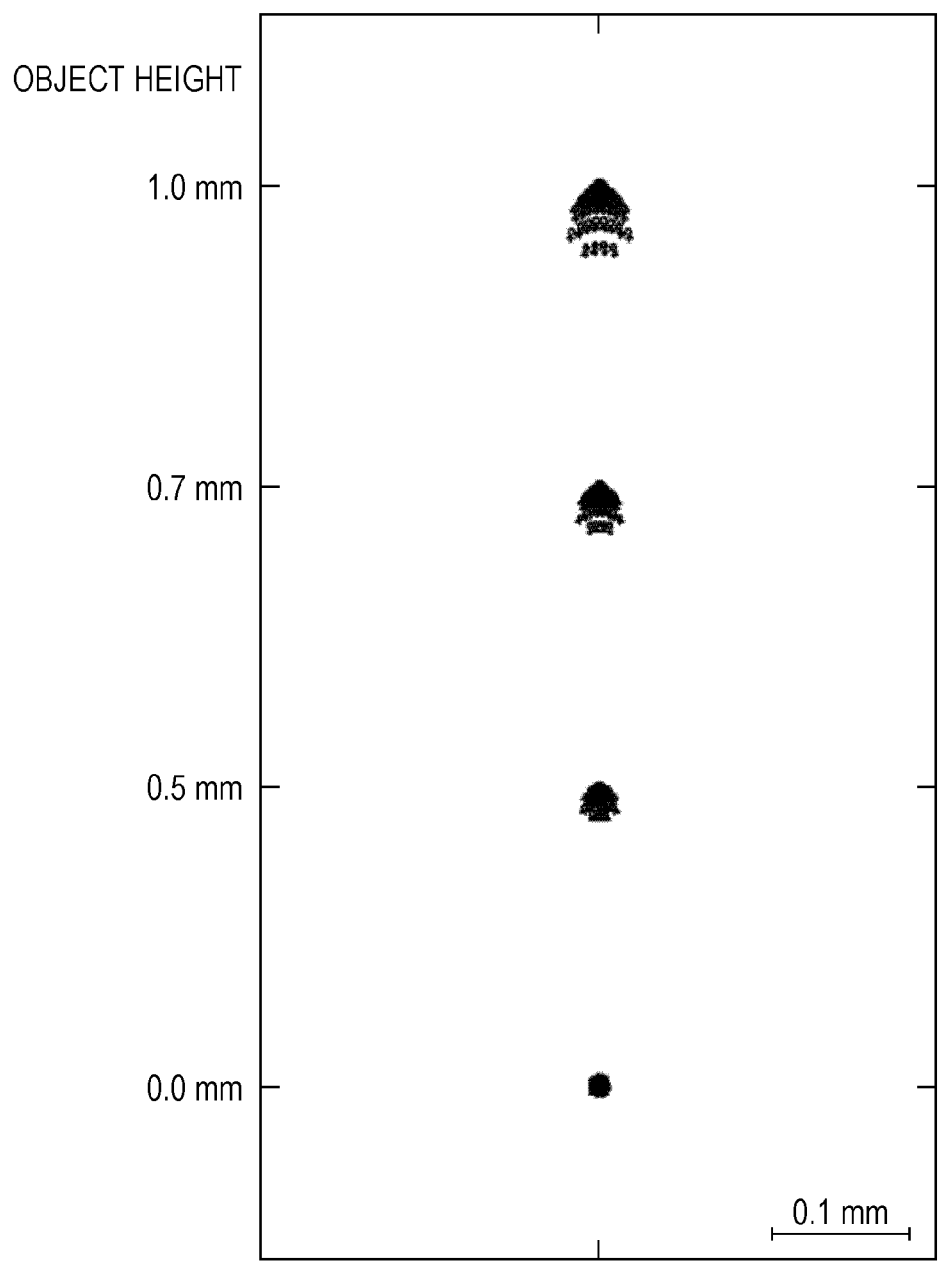
FIG. 15 illustrates a spot diagram of the optical system in which the relay lens and the correction optical system of the optical system for an endoscope according to the fourth embodiment are combined.

FIGS. 14 and 15 illustrate the optical performance of the optical system in which the relay lens 3 and the correction optical system 70 of the optical system according to the present embodiment are combined. FIG. 14 illustrates longitudinal aberrations and FIG. 15 illustrates a spot diagram. It can be seen from FIG. 14 that, by combining the relay lens 3 and the correction optical system 70, curvature of field and astigmatism are significantly reduced. Furthermore, it can be seen from FIG. 15 that the spot diameter at off-axis positions is significantly reduced.

Fifth Embodiment

A fifth embodiment is described with reference to FIGS. 16 and 17. Since the fifth embodiment has the same basic structure as that of the second embodiment, sectional views and description thereof are omitted. The difference between the fifth embodiment and the second embodiment is that, in the fifth embodiment, the curvature of the concave mirror 54 is increased and the distance between the surfaces are changed so as to form an image outside the beam splitter 53. If the distance between the surfaces is not changed, the image is formed inside the beam splitter 53 due to the increase in the curvature of the concave mirror 54.

In the present embodiment, L=0.484, M=−0.606, and S=−1.252. Thus, S<−0.50 is satisfied. Regarding the surfaces No. 27 and No. 34, which have aspherical shapes, the signs of the radii of curvature r are opposite to the signs of the aspherical coefficients of fourth order, and the aspherical coefficients of the sixth and higher orders are zero. Thus, the surfaces No. 27 and No. 34 have shapes in which the local curvature is reducing from a central part toward a circumferential part.

In the present embodiment, the number of concave mirrors is two, the average of thicknesses of the beam splitters is 4.00 mm, the average of the absolute values of the refractive indices of the beam splitters is 1.51633, and the average of the absolute values of the radii of curvature of the concave mirrors is 6.60 mm. Thus, T=1.251, and accordingly, T>1.1 is satisfied.

Figure 16:
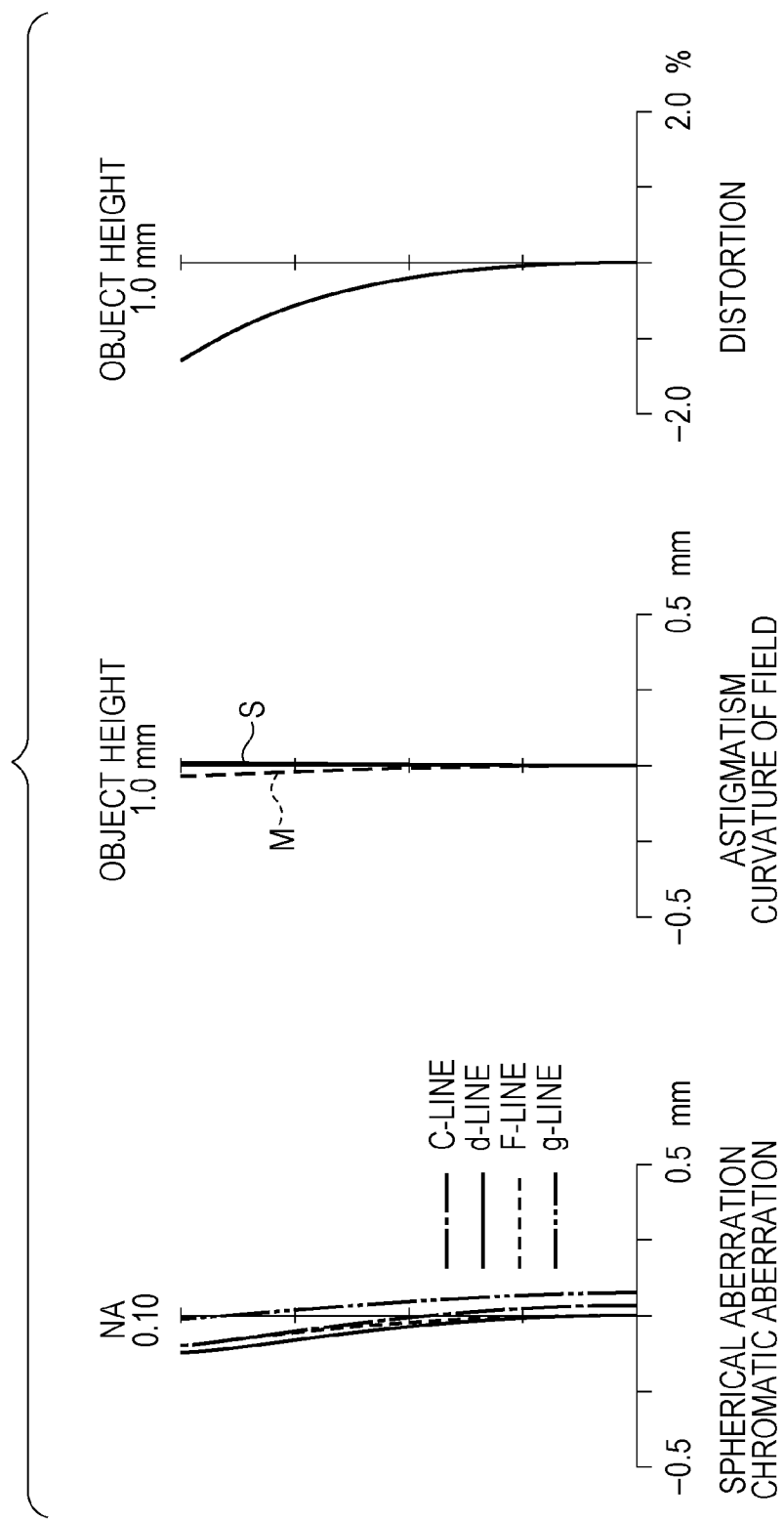
FIG. 16 illustrates longitudinal aberrations of an optical system in which a relay lens and a correction optical system of an optical system for an endoscope according to a fifth embodiment are combined.
Figure 17:
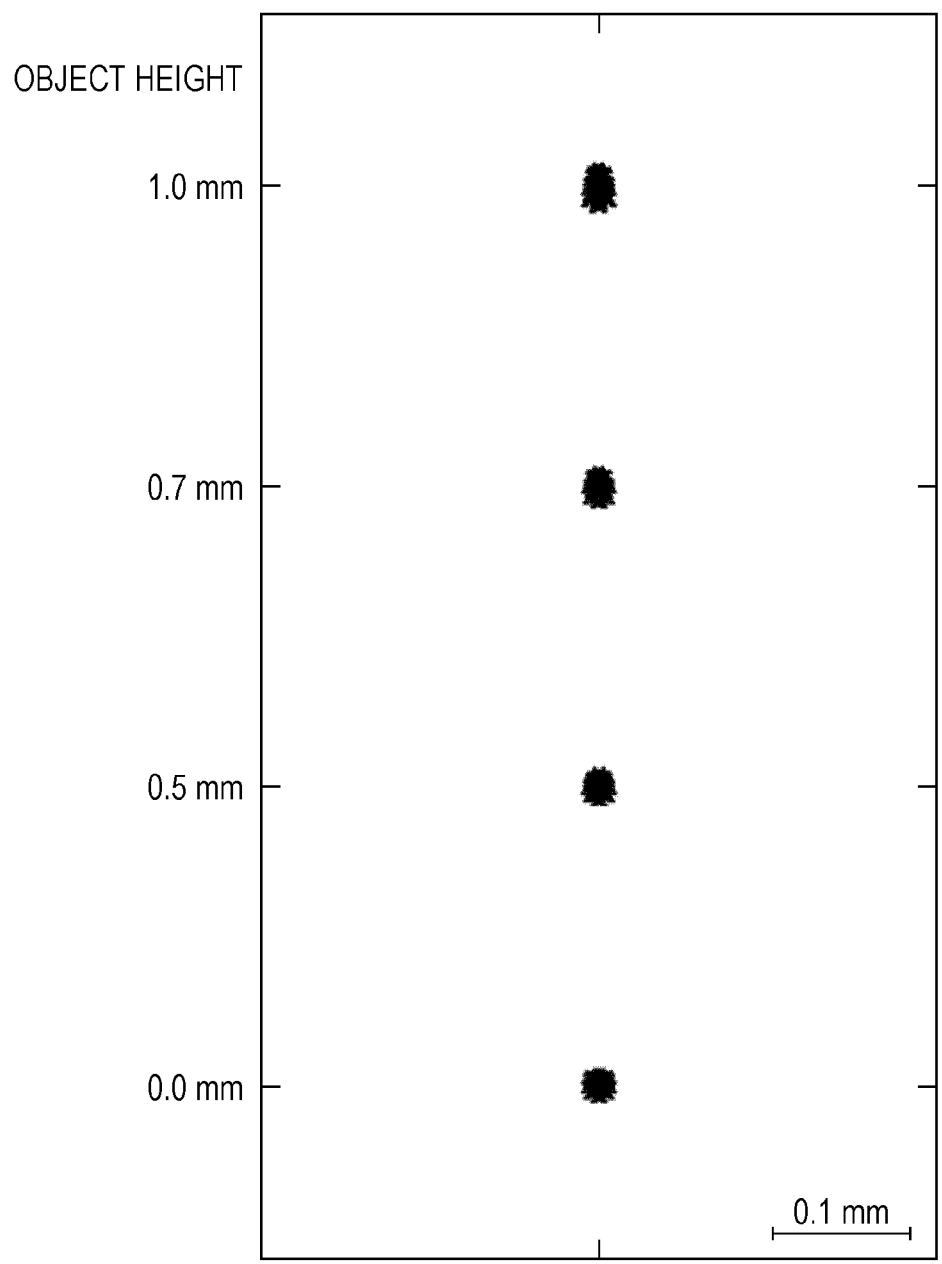
FIG. 17 illustrates a spot diagram of the optical system in which the relay lens and the correction optical system of the optical system for an endoscope according to the fifth embodiment are combined.

FIGS. 16 and 17 illustrate the optical performance of the optical system in which the relay lens 3 and the correction optical system 50 of the optical system according to the present embodiment are combined. FIG. 16 illustrates longitudinal aberrations and FIG. 17 illustrates a spot diagram. It can be seen from FIG. 16 that, by combining the relay lens 3 and the correction optical system 50, curvature of field and astigmatism are reduced. Furthermore, it can be seen from FIG. 17 that the spot diameter at off-axis positions is reduced.

Sixth Embodiment

A sixth embodiment is described with reference to FIGS. 18 and 19. Since the sixth embodiment has the same basic structure as that of the third embodiment, sectional views and description thereof are omitted. In the sixth embodiment, the curvature of the concave mirror 63 is reduced compared to that in the third embodiment.

In the present embodiment, L=0.484, M=−0.275, and S=−0.568. Thus, S<−0.50 is satisfied. Regarding the surface No. 28 (surface No. 30), which has an aspherical shape, the sign of the radius of curvature r is opposite to the sign of the aspherical coefficient of fourth order, and the aspherical coefficients of the sixth and higher orders are zero. Thus, the surface No. 28 (surface No. 30) has a shape in which the local curvature is reducing from a central part toward a circumferential part.

In the present embodiment, the number of concave mirrors is one, the average of thicknesses of the beam splitters is 4.00 mm, the average of the absolute values of the refractive indices of the beam splitters is 1.51633, and the average of the absolute values of the radii of curvature of the concave mirrors is 6.25 mm. Thus, T=2.369, and accordingly, T>1.1 is satisfied.

Figure 18:
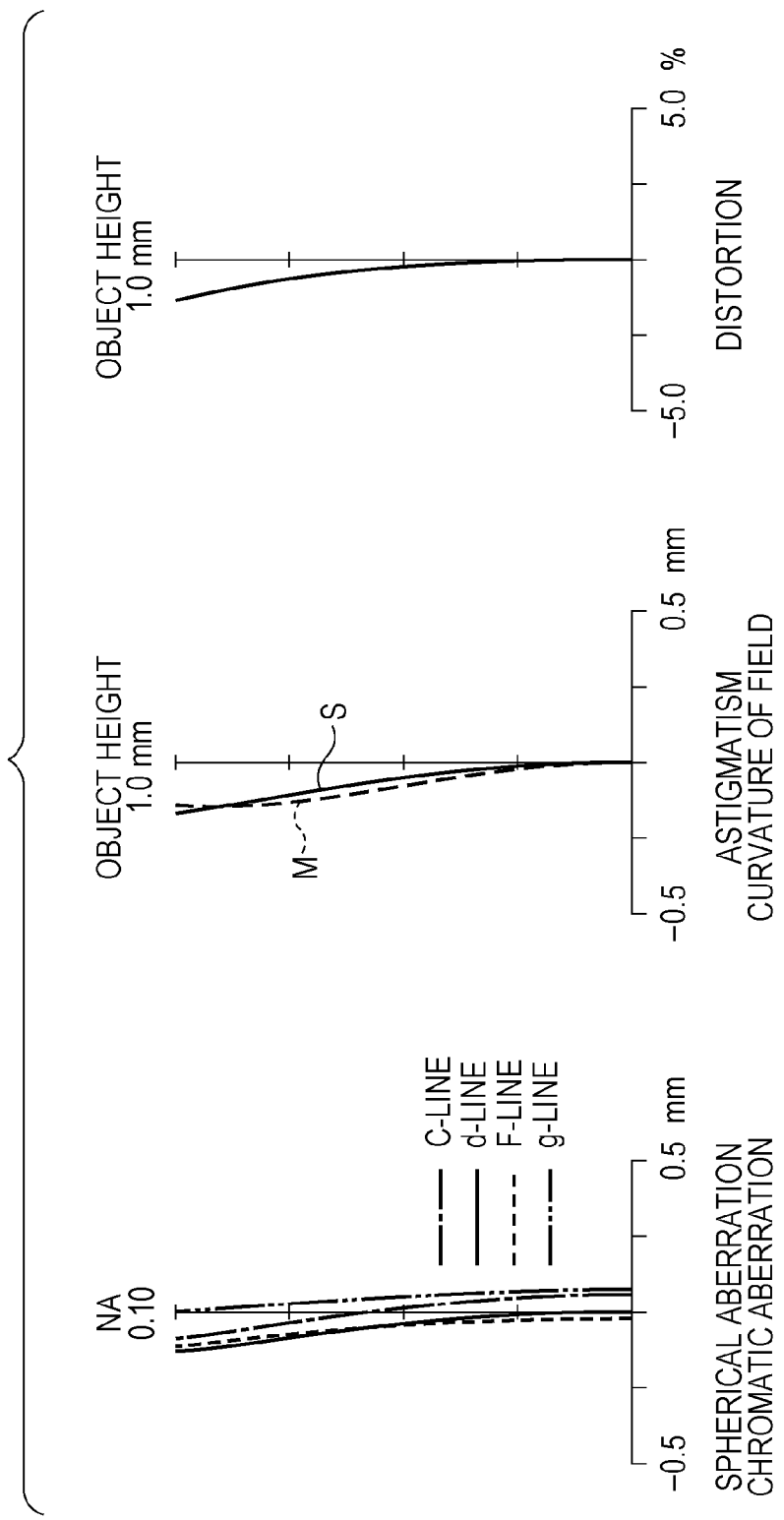
FIG. 18 illustrates longitudinal aberrations of an optical system in which a relay lens and a correction optical system of an optical system for an endoscope according to a sixth embodiment are combined.
Figure 19:
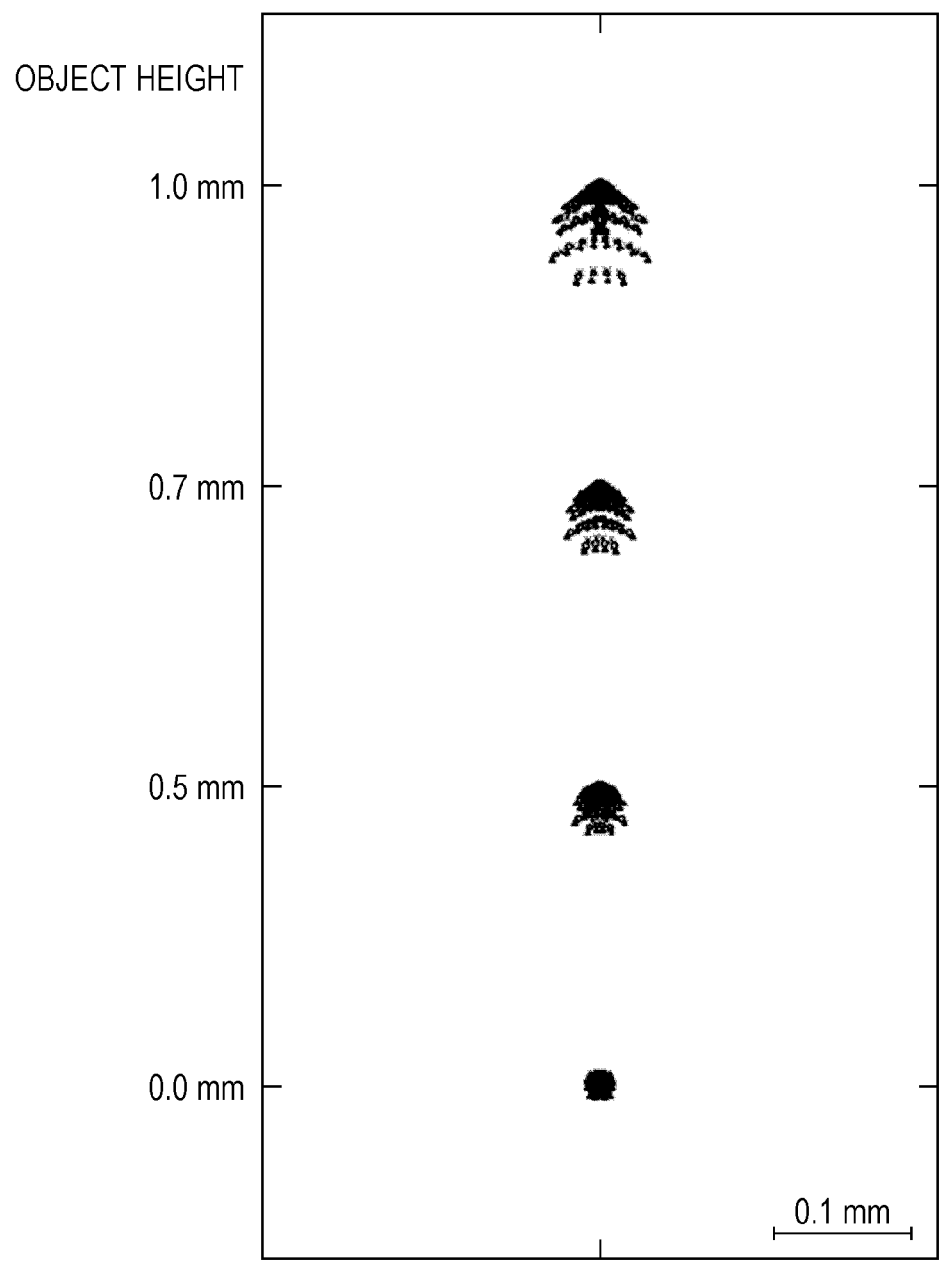
FIG. 19 illustrates a spot diagram of the optical system in which the relay lens and the correction optical system of the optical system for an endoscope according to the sixth embodiment are combined.

FIGS. 18 and 19 illustrate the optical performance of the optical system in which the relay lens 3 and the correction optical system 60 of the optical system according to the present embodiment are combined. FIG. 18 illustrates longitudinal aberrations and FIG. 19 illustrates a spot diagram. It can be seen from FIG. 18 that, by combining the relay lens 3 and the correction optical system 60, curvature of field and astigmatism are reduced. Furthermore, it can be seen from FIG. 19 that the spot diameter at off-axis positions is reduced.

Figure 20:
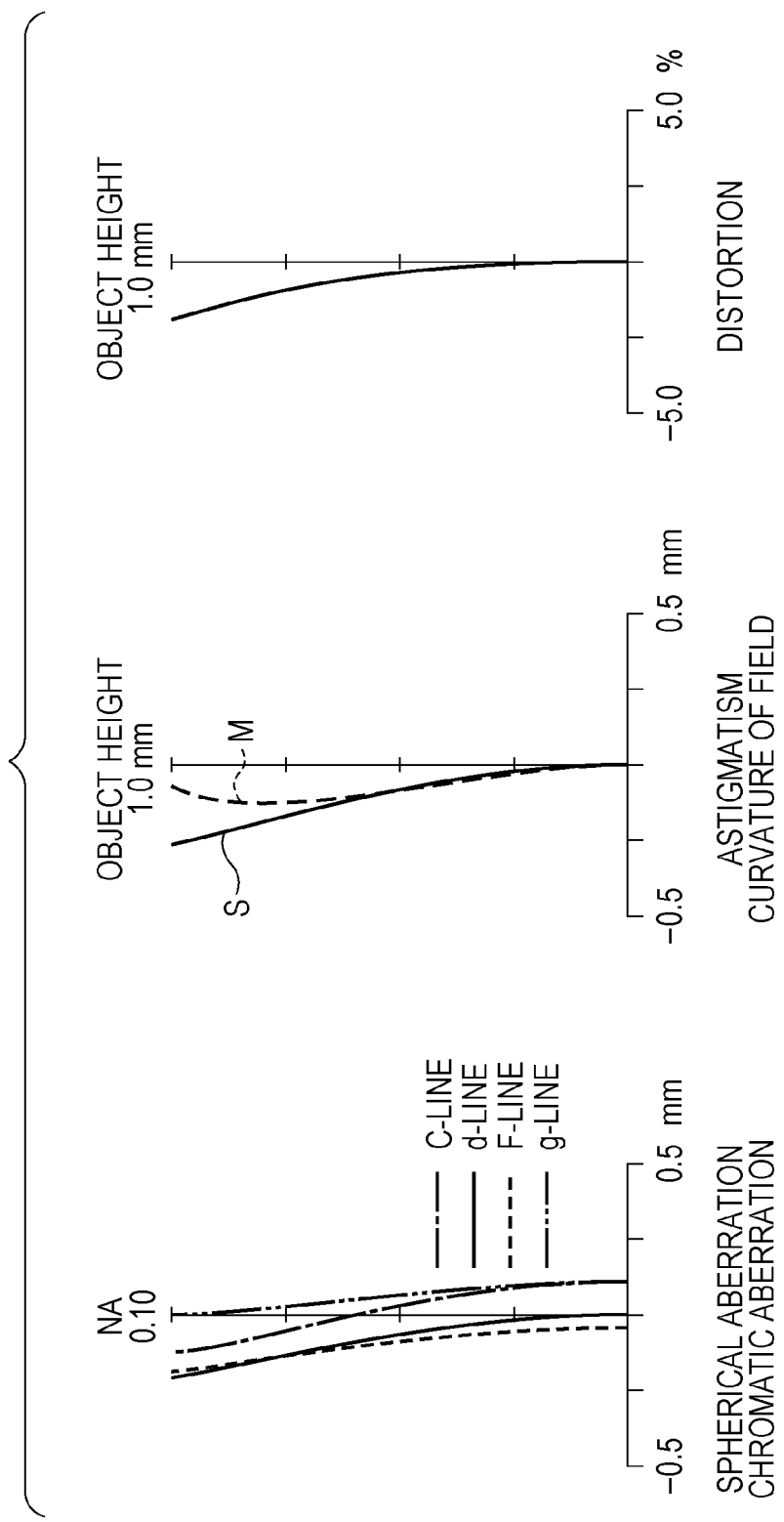
FIG. 20 illustrates longitudinal aberrations when a parameter S exceeds an appropriate range.
Figure 21:
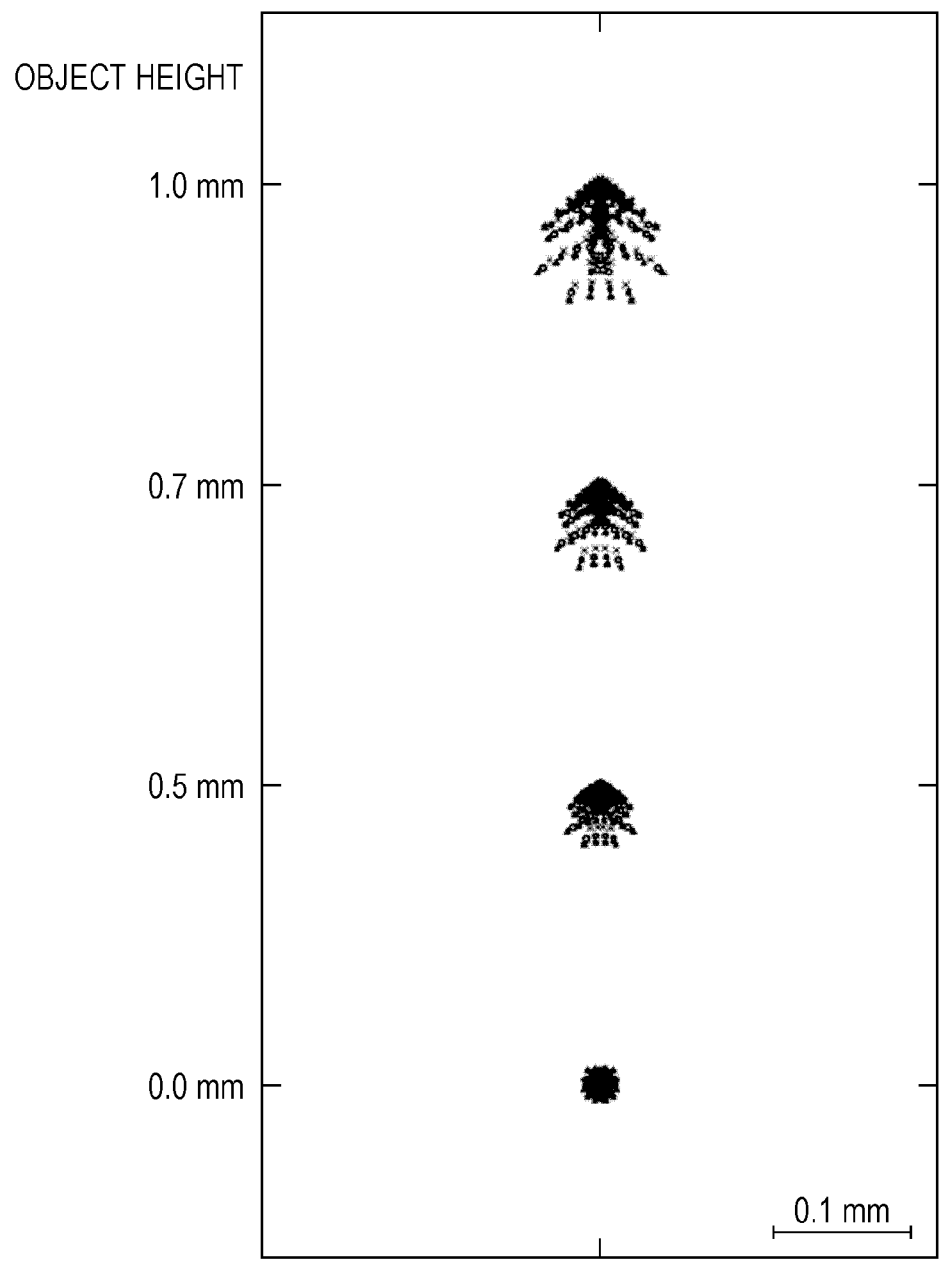
FIG. 21 illustrates a spot diagram when the parameter S exceeds an appropriate range.

Next, an appropriate range of the parameter S is described. As a comparative example, the curvature of the concave mirror 63 is further reduced in the sixth embodiment. Specifically, the radius of curvature of the surface No. 29 is set to −7.2. The parameters are as follows: L=0.484, M=−0.233, S=−0.481. FIG. 20 illustrates longitudinal aberrations and FIG. 21 illustrates a spot diagram. The spot diameter at the maximum object height is 0.102 mm, which is more than 0.1 mm. This diameter exceeds 1/20 of the diameter of a screen and is not desirable because degradation in resolution becomes clearly visible. Furthermore, the ratio of reduction in the spot diameter from the spot diameter of 0.186 mm, which is observed when the relay lens is used and the correction optical system is not used, is less than 50%. Thus, a significant effect is not obtained by adding the correction optical system. Thus, it is preferable that S<−0.50 be satisfied.

In each of the numerical embodiments, a "Surface No." represents an ordinal position of each of the optical surfaces or planes from the object plane of the relay lens to the image plane of the correction optical system. Each of the light beam travels through these surfaces or planes in the order of the surface number. The radius of curvature of an ith optical surface is represented by "r". The distance between the ith and i+1 th surfaces is represented by "d". The refractive index and the Abbe number of a material for a light beam of 587.6 nm (d-line) are respectively represented by "nd" and "vd". The signs of refractive indices of surfaces on the distal and proximal end sides of a reflective surface are reversed. In each of the numerical embodiments, the numerical aperture (NA) of the relay lens is 0.1 and the object height of the relay lens is 1.0 mm.

Also, in each of the numerical embodiments, the shape of the aspherical surface is expressed by the following general aspherical surface equation. In the following equation, Z is a coordinate in the optical axis direction, c is the curvature (the inverse of the radius of curvature r), h is the height from the optical axis, k is a conic constant, A, B, C, D, E, F, G, H, J, . . . •are respectively the aspherical coefficients of fourth order, sixth order, eighth order, tenth order, twelfth order, fourteenth order, sixteenth order, eighteenth order, twentieth order, . . . .

$$Z = \frac{ch^2}{1 + \sqrt{(1+k)c^2h^2}} + Ah^4 + Bh^6 + Ch^8 + Dh^{10} + Eh^{12} + Fh^{14} + Gh^{16} + Hh^{18} + Jh^{20} + \ldots \quad [\text{Math. 1}]$$

In each of the numerical embodiments, aspherical coefficients of twelfth E and higher orders are zero and omitted from the lists.

In each of the numerical embodiments, although only the fourth order is used as the aspherical coefficient, the aspherical coefficient of higher than fourth order may be used. Alternatively, only the conic constant may be used so that the mirror has a conic surface. Although a real image is formed outside the members of the correction optical system in the embodiments, the image may be formed in the members of the correction optical system. In the aforementioned embodiments, efficiency of use of light may be degraded due to use of the beam splitters (half mirrors) and noise may be generated by branched unnecessary light. In order to address this, polarization and polarizing plates may be used. The shape of the beam splitters is not limited to a cubic shape as described in the embodiments. Plane parallel plate beam splitters may be used. Instead of the beam splitter, a concave mirror, part of which corresponding to the center of the pupil is shielded, or a concave mirror, only off-axis portions of which are used, may be used. In the embodiments, the correction optical system is disposed on the proximal end side of the relay lens. However, this does not limit the position of the correction optical system. The correction optical system can be disposed at an arbitrary position as long as the position is on the proximal end side of the objective lens. Although the number of concave mirrors used in the correction optical system is one or two in the embodiments, three or more concave mirrors may be used in accordance with the degree of curvature of field caused by the relay lens. The technology described herein may be applied to applications other than applications in which an image is formed on an image pickup device by an imaging lens. For example, the technology may be applied to an application in which an object is observed by using an eyepiece.

First Numerical Embodiment (in mm)

Surface Data

| Surface No. | r | d | nd | vd |
|---|---|---|---|---|
| Object | Flat | 3.307 | 1.00000 | |
| 1 | 8.000 | 20.000 | 1.51633 | 64.1 |
| 2 | −4.338 | 1.000 | 1.62004 | 36.3 |
| 3 | −8.000 | 1.596 | 1.00000 | |
| 4 (Aperture stop) | Flat | 1.596 | 1.00000 | |
| 5 | 8.000 | 1.000 | 1.62004 | 36.3 |
| 6 | 4.338 | 20.000 | 1.51633 | 64.1 |
| 7 | −8.000 | 3.307 | 1.00000 | |
| 8 (Image plane) | Flat | 3.307 | 1.00000 | |
| 9 | 8.000 | 20.000 | 1.51633 | 64.1 |
| 10 | −4.338 | 1.000 | 1.62004 | 36.3 |
| 11 | −8.000 | 1.596 | 1.00000 | |
| 12 (Aperture stop) | Flat | 1.596 | 1.00000 | |
| 13 | 8.000 | 1.000 | 1.62004 | 36.3 |
| 14 | 4.338 | 20.000 | 1.51633 | 64.1 |
| 15 | −8.000 | 3.307 | 1.00000 | |
| 16 (Image plane) | Flat | 3.307 | 1.00000 | |
| 17 | 8.000 | 20.000 | 1.51633 | 64.1 |
| 18 | −4.338 | 1.000 | 1.62004 | 36.3 |
| 19 | −8.000 | 1.596 | 1.00000 | |
| 20 (Aperture stop) | Flat | 1.596 | 1.00000 | |
| 21 | 8.000 | 1.000 | 1.62004 | 36.3 |
| 22 | 4.338 | 20.000 | 1.51633 | 64.1 |
| 23 | −8.000 | 3.307 | 1.00000 | |
| 24 (Image plane) | Flat | 0.492 | 1.00000 | |
| 25 | Flat | 4.000 | 1.51633 | 64.1 |
| 26 | Flat | 1.000 | 1.00000 | |
| 27 (Aspherical surface) Reflective | −4.130 | −1.000 | −1.00000 | |
| 28 | Flat | −2.000 | −1.51633 | 64.1 |
| 29 Reflective | Flat | 2.000 | 1.51633 | 64.1 |
| 30 | Flat | 0.492 | 1.00000 | |

Aspherical Surface Data

| Surface No. | r | k | A | B | C | D |
|---|---|---|---|---|---|---|
| 27 | −4.130 | 0 | 1.839E−03 | 0 | 0 | 0 |

Second Numerical Embodiment (in mm)

Surface Data

| Surface No. | | r | d | nd | vd |
|---|---|---|---|---|---|
| | Object | Flat | 3.307 | 1.00000 | |
| 1 | | 8.000 | 20.000 | 1.51633 | 64.1 |
| 2 | | −4.338 | 1.000 | 1.62004 | 36.3 |
| 3 | | −8.000 | 1.596 | 1.00000 | |
| 4 | (Aperture stop) | Flat | 1.596 | 1.00000 | |
| 5 | | 8.000 | 1.000 | 1.62004 | 36.3 |
| 6 | | 4.338 | 20.000 | 1.51633 | 64.1 |
| 7 | | −8.000 | 3.307 | 1.00000 | |
| 8 | (Image plane) | Flat | 3.307 | 1.00000 | |
| 9 | | 8.000 | 20.000 | 1.51633 | 64.1 |
| 10 | | −4.338 | 1.000 | 1.62004 | 36.3 |
| 11 | | −8.000 | 1.596 | 1.00000 | |
| 12 | (Aperture stop) | Flat | 1.596 | 1.00000 | |
| 13 | | 8.000 | 1.000 | 1.62004 | 36.3 |
| 14 | | 4.338 | 20.000 | 1.51633 | 64.1 |
| 15 | | −8.000 | 3.307 | 1.00000 | |
| 16 | (Image plane) | Flat | 3.307 | 1.00000 | |
| 17 | | 8.000 | 20.000 | 1.51633 | 64.1 |
| 18 | | −4.338 | 1.000 | 1.62004 | 36.3 |
| 19 | | −8.000 | 1.596 | 1.00000 | |
| 20 | (Aperture stop) | Flat | 1.596 | 1.00000 | |
| 21 | | 8.000 | 1.000 | 1.62004 | 36.3 |
| 22 | | 4.338 | 20.000 | 1.51633 | 64.1 |
| 23 | | −8.000 | 3.307 | 1.00000 | |
| 24 | (Image plane) | Flat | 0.487 | 1.00000 | |
| 25 | | Flat | 4.000 | 1.51633 | 64.1 |
| 26 | | Flat | 1.000 | 1.00000 | |
| 27 | (Aspherical surface) Reflective | −8.250 | −1.000 | −1.00000 | |
| 28 | | Flat | −2.000 | −1.51633 | 64.1 |
| 29 | | Flat | 2.000 | 1.51633 | 64.1 |
| | Reflective | | | | |
| 30 | | Flat | 0.487 | 1.00000 | |
| 31 | | Flat | 0.487 | 1.00000 | |
| 32 | | Flat | 4.000 | 1.51633 | 64.1 |
| 33 | | Flat | 1.000 | 1.00000 | |
| 34 | (Aspherical surface) Reflective | −8.250 | −1.000 | −1.00000 | |
| 35 | | Flat | −2.000 | −1.51633 | 64.1 |
| 36 | | Flat | 2.000 | 1.51633 | 64.1 |
| | Reflective | | | | |
| 37 | | Flat | 0.487 | 1.00000 | |

Aspherical Surface Data

| Surface No. | r | k | A | B | C | D |
|---|---|---|---|---|---|---|
| 27 | −8.250 | 0 | 9.300E−04 | 0 | 0 | 0 |
| 34 | −8.250 | 0 | 9.300E−04 | 0 | 0 | 0 |

Third Numerical Embodiment (in mm)

Surface Data

| Surface No. | | r | d | nd | vd |
|---|---|---|---|---|---|
| | Object | Flat | 3.307 | 1.00000 | |
| 1 | | 8.000 | 20.000 | 1.51633 | 64.1 |
| 2 | | −4.338 | 1.000 | 1.62004 | 36.3 |
| 3 | | −8.000 | 1.596 | 1.00000 | |
| 4 | (Aperture stop) | Flat | 1.596 | 1.00000 | |
| 5 | | 8.000 | 1.000 | 1.62004 | 36.3 |
| 6 | | 4.338 | 20.000 | 1.51633 | 64.1 |
| 7 | | −8.000 | 3.307 | 1.00000 | |
| 8 | (Image plane) | Flat | 3.307 | 1.00000 | |
| 9 | | 8.000 | 20.000 | 1.51633 | 64.1 |
| 10 | | −4.338 | 1.000 | 1.62004 | 36.3 |
| 11 | | −8.000 | 1.596 | 1.00000 | |
| 12 | (Aperture stop) | Flat | 1.596 | 1.00000 | |
| 13 | | 8.000 | 1.000 | 1.62004 | 36.3 |
| 14 | | 4.338 | 20.000 | 1.51633 | 64.1 |
| 15 | | −8.000 | 3.307 | 1.00000 | |
| 16 | (Image plane) | Flat | 3.307 | 1.00000 | |
| 17 | | 8.000 | 20.000 | 1.51633 | 64.1 |
| 18 | | −4.338 | 1.000 | 1.62004 | 36.3 |
| 19 | | −8.000 | 1.596 | 1.00000 | |
| 20 | (Aperture stop) | Flat | 1.596 | 1.00000 | |
| 21 | | 8.000 | 1.000 | 1.62004 | 36.3 |
| 22 | | 4.338 | 20.000 | 1.51633 | 64.1 |
| 23 | | −8.000 | 3.307 | 1.00000 | |
| 24 | (Image plane) | Flat | 1.000 | 1.00000 | |
| 25 | | Flat | 4.000 | 1.51633 | 64.1 |
| 26 | | Flat | 0.200 | 1.00000 | |
| 27 | | Flat | 0.500 | 1.51633 | 64.1 |
| 28 | (Aspherical surface) | −15.119 | 0.800 | 1.00000 | |
| 29 | | −5.000 | −0.800 | −1.00000 | |
| | Reflective | | | | |
| 30 | (Aspherical surface) | −15.119 | −0.500 | −1.51633 | 64.1 |
| 31 | | Flat | −0.200 | −1.00000 | |
| 32 | | Flat | −2.000 | −1.51633 | 64.1 |
| 33 | | Flat | 2.000 | 1.51633 | 64.1 |
| | Reflective | | | | |
| 34 | | Flat | 0.100 | 1.00000 | |

Aspherical Surface Data

| Surface No. | r | k | A | B | C | D |
|---|---|---|---|---|---|---|
| 28, 30 | −15.119 | 0 | 4.646E−03 | 0 | 0 | 0 |

Fourth Numerical Embodiment (in mm)

Surface Data

| Surface No. | | r | d | nd | vd |
|---|---|---|---|---|---|
| | Object | Flat | 3.307 | 1.00000 | |
| 1 | | 8.000 | 20.000 | 1.51633 | 64.1 |
| 2 | | −4.338 | 1.000 | 1.62004 | 36.3 |
| 3 | | −8.000 | 1.596 | 1.00000 | |
| 4 | (Aperture stop) | Flat | 1.596 | 1.00000 | |
| 5 | | 8.000 | 1.000 | 1.62004 | 36.3 |
| 6 | | 4.338 | 20.000 | 1.51633 | 64.1 |
| 7 | | −8.000 | 3.307 | 1.00000 | |
| 8 | (Image plane) | Flat | 3.307 | 1.00000 | |
| 9 | | 8.000 | 20.000 | 1.51633 | 64.1 |
| 10 | | −4.338 | 1.000 | 1.62004 | 36.3 |
| 11 | | −8.000 | 1.596 | 1.00000 | |
| 12 | (Aperture stop) | Flat | 1.596 | 1.00000 | |
| 13 | | 8.000 | 1.000 | 1.62004 | 36.3 |
| 14 | | 4.338 | 20.000 | 1.51633 | 64.1 |
| 15 | | −8.000 | 3.307 | 1.00000 | |
| 16 | (Image plane) | Flat | 3.307 | 1.00000 | |
| 17 | | 8.000 | 20.000 | 1.51633 | 64.1 |
| 18 | | −4.338 | 1.000 | 1.62004 | 36.3 |
| 19 | | −8.000 | 1.596 | 1.00000 | |
| 20 | (Aperture stop) | Flat | 1.596 | 1.00000 | |
| 21 | | 8.000 | 1.000 | 1.62004 | 36.3 |
| 22 | | 4.338 | 20.000 | 1.51633 | 64.1 |
| 23 | | −8.000 | 3.307 | 1.00000 | |
| 24 | (Image plane) | Flat | 1.000 | 1.00000 | |
| 25 | | Flat | 4.000 | 1.51633 | 64.1 |
| 26 | | Flat | 0.500 | 1.00000 | |
| 27 | | −5.993 | 0.800 | 1.51633 | 64.1 |
| 28 | (Aspherical surface) Reflective | −5.000 | −0.800 | −1.51633 | 64.1 |
| 29 | | −5.993 | −0.500 | −1.00000 | |
| 30 | | Flat | −2.000 | −1.51633 | 64.1 |

-continued (in mm)

| | | | | |
|---|---|---|---|---|
| 31 | Flat | 2.000 | 1.51633 | 64.1 |
| Reflective | | | | |
| 32 | Flat | 0.097 | 1.00000 | |

Aspherical Surface Data

| Surface No. | r | k | A | B | C | D |
|---|---|---|---|---|---|---|
| 28 | −5.000 | 0 | 6.352E−04 | 0 | 0 | 0 |

Fifth Numerical Embodiment (in mm)

Surface Data

| Surface No. | r | d | nd | vd |
|---|---|---|---|---|
| Object | Flat | 3.307 | 1.00000 | |
| 1 | 8.000 | 20.000 | 1.51633 | 64.1 |
| 2 | −4.338 | 1.000 | 1.62004 | 36.3 |
| 3 | −8.000 | 1.596 | 1.00000 | |
| 4 (Aperture stop) | Flat | 1.596 | 1.00000 | |
| 5 | 8.000 | 1.000 | 1.62004 | 36.3 |
| 6 | 4.338 | 20.000 | 1.51633 | 64.1 |
| 7 | −8.000 | 3.307 | 1.00000 | |
| 8 (Image plane) | Flat | 3.307 | 1.00000 | |
| 9 | 8.000 | 20.000 | 1.51633 | 64.1 |
| 10 | −4.338 | 1.000 | 1.62004 | 36.3 |
| 11 | −8.000 | 1.596 | 1.00000 | |
| 12 (Aperture stop) | Flat | 1.596 | 1.00000 | |
| 13 | 8.000 | 1.000 | 1.62004 | 36.3 |
| 14 | 4.338 | 20.000 | 1.51633 | 64.1 |
| 15 | −8.000 | 3.307 | 1.00000 | |
| 16 (Image plane) | Flat | 3.307 | 1.00000 | |
| 17 | 8.000 | 20.000 | 1.51633 | 64.1 |
| 18 | −4.338 | 1.000 | 1.62004 | 36.3 |
| 19 | −8.000 | 1.596 | 1.00000 | |
| 20 (Aperture stop) | Flat | 1.596 | 1.00000 | |
| 21 | 8.000 | 1.000 | 1.62004 | 36.3 |
| 22 | 4.338 | 20.000 | 1.51633 | 64.1 |
| 23 | −8.000 | 3.307 | 1.00000 | |
| 24 (Image plane) | Flat | 0.200 | 1.00000 | |
| 25 | Flat | 4.000 | 1.51633 | 64.1 |
| 26 | Flat | 0.500 | 1.00000 | |
| 27 (Aspherical surface) | −6.600 | −0.500 | −1.00000 | |
| Reflective | | | | |
| 28 | Flat | −2.000 | −1.51633 | 64.1 |
| 29 | Flat | 2.000 | 1.51633 | 64.1 |
| Reflective | | | | |
| 30 | Flat | 0.100 | 1.00000 | |
| 31 | Flat | 0.100 | 1.00000 | |
| 32 | Flat | 4.000 | 1.51633 | 64.1 |
| 33 | Flat | 0.500 | 1.00000 | |
| 34 (Aspherical surface) | −6.600 | −0.500 | −1.00000 | |
| Reflective | | | | |
| 35 | Flat | −2.000 | −1.51633 | 64.1 |
| 36 | Flat | 2.000 | 1.51633 | 64.1 |
| Reflective | | | | |
| 37 | Flat | 0.124 | 1.00000 | |

Aspherical Surface Data

| Surface No. | r | k | A | B | C | D |
|---|---|---|---|---|---|---|
| 27 | −6.600 | 0 | 1.415E−03 | 0 | 0 | 0 |
| 34 | −6.600 | 0 | 1.415E−03 | 0 | 0 | 0 |

Sixth Numerical Embodiment (in mm)

Surface Data

| Surface No. | r | d | nd | vd |
|---|---|---|---|---|
| Object | Flat | 3.307 | 1.00000 | |
| 1 | 8.000 | 20.000 | 1.51633 | 64.1 |
| 2 | −4.338 | 1.000 | 1.62004 | 36.3 |
| 3 | −8.000 | 1.596 | 1.00000 | |
| 4 (Aperture stop) | Flat | 1.596 | 1.00000 | |
| 5 | 8.000 | 1.000 | 1.62004 | 36.3 |
| 6 | 4.338 | 20.000 | 1.51633 | 64.1 |
| 7 | −8.000 | 3.307 | 1.00000 | |
| 8 (Image plane) | Flat | 3.307 | 1.00000 | |
| 9 | 8.000 | 20.000 | 1.51633 | 64.1 |
| 10 | −4.338 | 1.000 | 1.62004 | 36.3 |
| 11 | −8.000 | 1.596 | 1.00000 | |
| 12 (Aperture stop) | Flat | 1.596 | 1.00000 | |
| 13 | 8.000 | 1.000 | 1.62004 | 36.3 |
| 14 | 4.338 | 20.000 | 1.51633 | 64.1 |
| 15 | −8.000 | 3.307 | 1.00000 | |
| 16 (Image plane) | Flat | 3.307 | 1.00000 | |
| 17 | 8.000 | 20.000 | 1.51633 | 64.1 |
| 18 | −4.338 | 1.000 | 1.62004 | 36.3 |
| 19 | −8.000 | 1.596 | 1.00000 | |
| 20 (Aperture stop) | Flat | 1.596 | 1.00000 | |
| 21 | 8.000 | 1.000 | 1.62004 | 36.3 |
| 22 | 4.338 | 20.000 | 1.51633 | 64.1 |
| 23 | −8.000 | 3.307 | 1.00000 | |
| 24 (Image plane) | Flat | 1.000 | 1.00000 | |
| 25 | Flat | 4.000 | 1.51633 | 64.1 |
| 26 | Flat | 0.200 | 1.00000 | |
| 27 | Flat | 0.500 | 1.51633 | 64.1 |
| 28 (Aspherical surface) | −15.119 | 0.800 | 1.00000 | |
| 29 | −6.250 | −0.800 | −1.00000 | |
| Reflective | | | | |
| 30 (Aspherical surface) | −15.119 | −0.500 | −1.51633 | 64.1 |
| 31 | Flat | −0.200 | −1.00000 | |
| 32 | Flat | −2.000 | −1.51633 | 64.1 |
| 33 | Flat | 2.000 | 1.51633 | 64.1 |
| Reflective | | | | |
| 34 | Flat | 1.934 | 1.00000 | |

Aspherical Surface Data

| Surface No. | r | k | A | B | C | D |
|---|---|---|---|---|---|---|
| 28, 30 | −15.119 | 0 | 4.646E−03 | 0 | 0 | 0 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-285258, filed Dec. 27, 2012, which is hereby incorporated by reference herein in its entirety.

The invention claimed is:
1. An optical system for an endoscope, comprising:
an objective lens;
a relay lens arrangement; and
a correction optical system disposed in an optical path on a proximal end side of the objective lens, the correction optical system correcting curvature of field caused by the relay lens arrangement,
wherein the correction optical system includes at least one beam splitter and at least one concave mirror having an aspherical surface, and
wherein the following relationship is satisfied:

$T > 1.1$, where the number of the at least one concave mirror included in an imaging optical system of the correction optical system is kk, an average of thicknesses of the at least one beam splitter is dd, an average of the absolute values of refractive indices of the at least one beam splitter is nn, an average of the absolute values of radii of curvature of the at least one concave mirror is RR, and T=nn·RR/(kk·dd).

2. The optical system for an endoscope according to claim 1,
wherein the at least one concave mirror includes first and second concave mirrors each having an aspherical surface, and the at least one beam splitter includes first and second beam splitters,
wherein light reflected by the first concave mirror is reflected by the first beam splitter, the light reflected by the first beam splitter is reflected by the second concave mirror, the light reflected by the second concave mirror is reflected by the second beam splitter, and the light reflected by the second beam splitter converges, and
wherein a pupil is positioned between the first concave mirror and the second concave mirror.

3. The optical system for an endoscope according to claim 2,
wherein the pupil is positioned at an intermediate position between the first concave mirror and the second concave mirror.

4. An optical system for an endoscope, comprising:
an objective lens;
a relay lens arrangement; and
a correction optical system disposed in an optical path on a proximal end side of the objective lens, the correction optical system correcting curvature of field caused by the relay lens arrangement,
wherein the correction optical system includes at least one beam splitter, an aspherical lens, and at least one concave mirror, and
wherein the following relationship is satisfied $$T>1.1,$$

where the number of the at least one concave mirror included in an imaging optical system of the correction optical system is kk, an average of thicknesses of the at least one beam splitter is dd, an average of the absolute values of refractive indices of the at least one beam splitter is nn, an average of the absolute values of radii of curvature of the at least one concave mirror is RR, and T=nn·RR/(kk·dd).

5. The optical system for an endoscope according to claim 1,
wherein the relay lens arrangement has a plurality of refractive surfaces and the correction optical system has a plurality of optical surfaces, and
wherein the following relationship is satisfied:

$$S<-0.50,$$

where a refractive power of each of the refractive surfaces of the relay lens arrangement is $\phi i$, the refractive index of a medium present on the distal end side of each of the refractive surfaces of the relay lens arrangement is Ni, the refractive index of a medium present on the proximal end side of each of the refractive surfaces of the relay lens arrangement is Ni', the sum of $\phi i/(Ni \cdot Ni')$ of the relay lens arrangement is L, refractive power of each of the optical surfaces of the correction optical system is $\phi j$, the refractive index of a medium present on the distal end side of each of the optical surfaces of the correction optical system is Nj, the refractive index of a medium present on the proximal end side of each of the optical surfaces of the correction optical system is Nj', the sum of $\phi j/(Nj \cdot Nj')$ of the correction optical system is M, and S=M/L.

6. The optical system for an endoscope according to claim 4,
wherein the relay lens arrangement has a plurality of refractive surfaces and the correction optical system has a plurality of optical surfaces, and
wherein the following relationship is satisfied:

$$S<-0.50,$$

where a refractive power of each of the refractive surfaces of the relay lens arrangement is $\phi i$, the refractive index of a medium present on the distal end side of each of the refractive surfaces of the relay lens arrangement is Ni, the refractive index of a medium present on the proximal end side of each of the refractive surfaces of the relay lens arrangement is Ni', the sum of $\phi i/(Ni \cdot Ni')$ of the relay lens arrangement is L, refractive power of each of the optical surfaces of the correction optical system is $\phi j$, the refractive index of a medium present on the distal end side of each of the optical surfaces of the correction optical system is Nj, the refractive index of a medium present on the proximal end side of each of the optical surfaces of the correction optical system is Nj', the sum of $\phi j/(Nj \cdot Nj')$ of the correction optical system is M, and S=M/L.

7. The optical system for an endoscope according to claim 1,
wherein the at least one concave mirror has an aspherical shape, a local curvature of the aspherical shape reducing from a central part toward a circumferential part thereof.

8. The optical system for an endoscope according to claim 4,
wherein the at least one concave mirror has an aspherical shape, a local curvature of the aspherical shape reducing from a central part toward a circumferential part thereof.

9. An optical system for an endoscope, comprising:
an objective lens;
a relay lens arrangement; and
a correction optical system disposed in an optical path on a proximal end side of the objective lens, the correction optical system correcting curvature of field caused by the relay lens arrangement,
wherein the correction optical system includes at least one concave mirror having an aspherical surface,
wherein the relay lens arrangement has a plurality of refractive surfaces and the correction optical system has a plurality of optical surfaces, and
wherein the following relationship is satisfied:

$$S<-0.50,$$

where refractive power of each of the refractive surfaces of the relay lens arrangement is $\phi i$, the refractive index of a medium present on the distal end side of each of the refractive surfaces of the relay lens arrangement is Ni, the refractive index of a medium present on the proximal end side of each of the refractive surfaces of the relay lens arrangement is Ni', the sum of $\phi i/(Ni \cdot Ni')$ of the relay lens arrangement is L, refractive power of each of the optical surfaces of the correction optical system is $\phi j$, the refractive index of a medium present on the distal end side of each of the optical surfaces of the correction optical system is Nj, the refractive index of a medium present on the proximal end side of each of the optical surfaces of the correction optical system is Nj', the sum of $\phi j/(Nj \cdot N_j')$ of the correction optical system is M, and S=M/L.

* * * * *